US012701591B2

(12) United States Patent
Nguyen et al.

(10) Patent No.: US 12,701,591 B2
(45) Date of Patent: Aug. 4, 2026

(54) TECHNIQUES FOR ADAPTIVE RESOURCE EXCLUSION THRESHOLDS

(71) Applicant: QUALCOMM Incorporated, San Diego, CA (US)

(72) Inventors: Tien Viet Nguyen, Bridgewater, NJ (US); Sourjya Dutta, San Diego, CA (US); Dan Vassilovski, Del Mar, CA (US)

(73) Assignee: QUALCOMM Incorporated, San Diego, CA (US)

( * ) Notice: Subject to any disclaimer, the term of this patent is extended or adjusted under 35 U.S.C. 154(b) by 358 days.

(21) Appl. No.: 18/466,352

(22) Filed: Sep. 13, 2023

(65) Prior Publication Data

US 2025/0089076 A1 Mar. 13, 2025

(51) Int. Cl.
H04W 72/40 (2023.01)
H04W 72/02 (2009.01)
H04W 72/232 (2023.01)

(52) U.S. Cl.
CPC ........... H04W 72/40 (2023.01); H04W 72/02 (2013.01); H04W 72/232 (2023.01)

(58) Field of Classification Search
CPC .... H04W 72/40; H04W 72/232; H04W 72/02
See application file for complete search history.

(56) References Cited

U.S. PATENT DOCUMENTS

| | | | | |
|---|---|---|---|---|
| 2020/0235848 A1* | 7/2020 | Nguyen | ................ | H04L 1/0038 |
| 2022/0110096 A1 | 4/2022 | Lin et al. | | |
| 2022/0303954 A1* | 9/2022 | Hwang | ............. | H04W 72/0453 |
| 2023/0131882 A1 | 4/2023 | Lin | | |
| 2023/0180216 A1 | 6/2023 | Hwang et al. | | |
| 2023/0217463 A1* | 7/2023 | Hui | ........................ | H04W 72/25 |
| | | | | 370/329 |

OTHER PUBLICATIONS

International Search Report and Written Opinion—PCT/US2024/041627—ISA/EPO—Nov. 29, 2024.

* cited by examiner

*Primary Examiner* — Won Tae C Kim
(74) *Attorney, Agent, or Firm* — Harrity & Harrity, LLP

(57) ABSTRACT

Various aspects of the present disclosure generally relate to wireless communication. In some aspects, a user equipment (UE) may receive a resource exclusion configuration for applying at least a first set of resource exclusion thresholds to a selection of sidelink resources for transmitting a sidelink communication, the first set of resource exclusion thresholds being based, at least in part, on one or more modulation and coding schemes (MCSs) or an MCS index. The UE may transmit the sidelink communication in accordance with the resource exclusion configuration. Numerous other aspects are described.

28 Claims, 12 Drawing Sheets

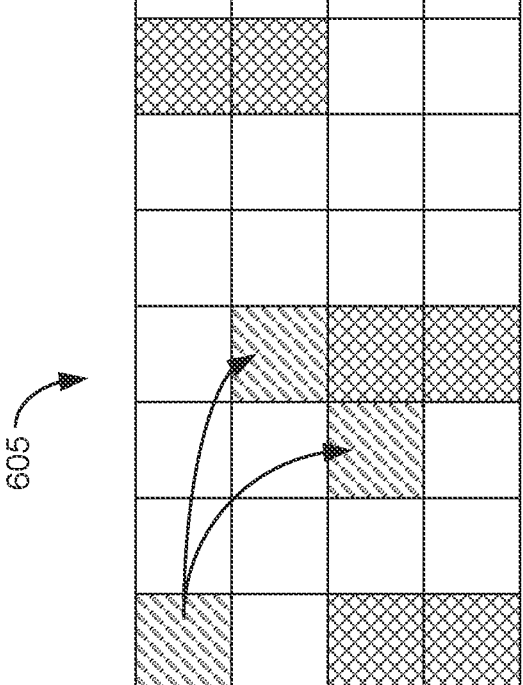
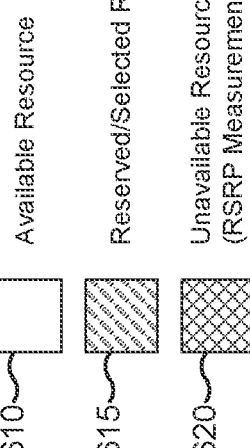
Available Resource
Reserved/Selected Resource
Unavailable Resource
(RSRP Measurements)
610
615
620
600
605
FIG. 6

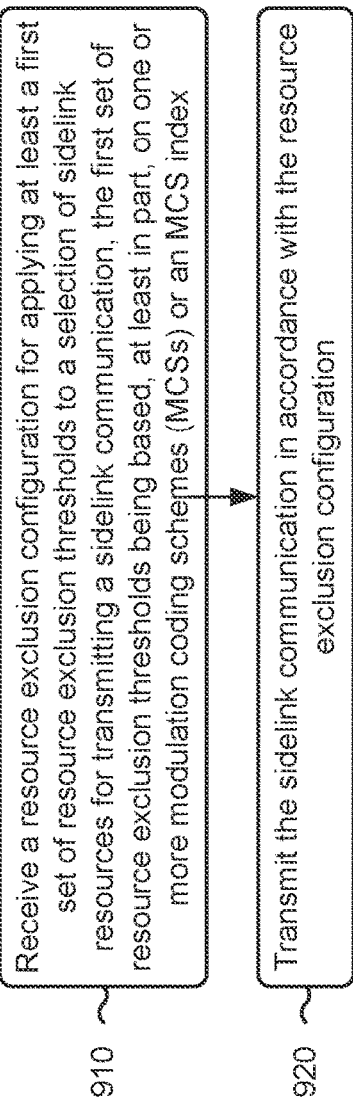

Receive a resource exclusion configuration for applying at least a first set of resource exclusion thresholds to a selection of sidelink resources for transmitting a sidelink communication, the first set of resource exclusion thresholds being based, at least in part, on one or more modulation coding schemes (MCSs) or an MCS index

910

Transmit the sidelink communication in accordance with the resource exclusion configuration

920

900

FIG. 9

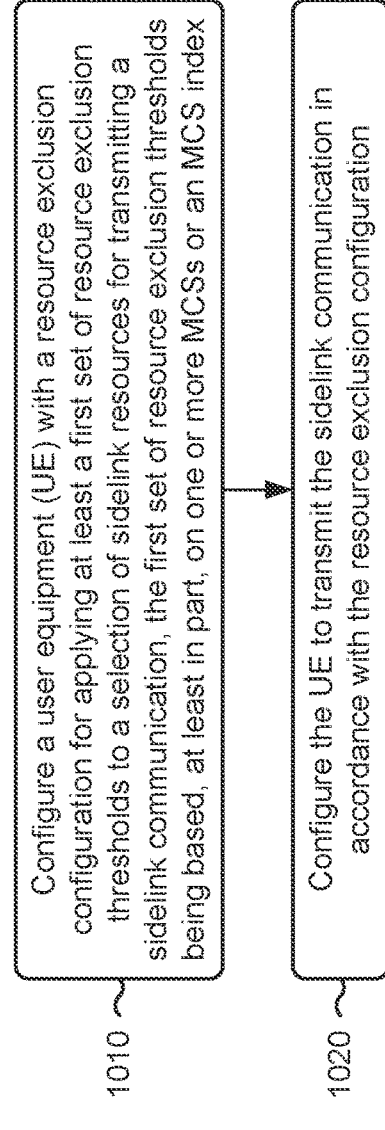

1010 Configure a user equipment (UE) with a resource exclusion configuration for applying at least a first set of resource exclusion thresholds to a selection of sidelink resources for transmitting a sidelink communication, the first set of resource exclusion thresholds being based, at least in part, on one or more MCSs or an MCS index 1020 Configure the UE to transmit the sidelink communication in accordance with the resource exclusion configuration

TECHNIQUES FOR ADAPTIVE RESOURCE EXCLUSION THRESHOLDS

FIELD OF THE DISCLOSURE

Aspects of the present disclosure generally relate to wireless communication and to techniques and apparatuses for adaptive resource exclusion thresholds.

DESCRIPTION OF RELATED ART

Wireless communication systems are widely deployed to provide various telecommunication services such as telephony, video, data, messaging, and broadcasts. Typical wireless communication systems may employ multiple-access technologies capable of supporting communication with multiple users by sharing available system resources (for example, bandwidth, transmit power, etc.). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more network nodes that support communication for wireless communication devices, such as a user equipment (UE) or multiple UEs. A UE may communicate with a network node via downlink communications and uplink communications. "Downlink" (or "DL") refers to a communication link from the network node to the UE, and "uplink" (or "UL") refers to a communication link from the UE to the network node. Some wireless networks may support device-to-device communication, such as via a local link (e.g., a sidelink (SL), a wireless local area network (WLAN) link, and/or a wireless personal area network (WPAN) link, among other examples).

These multiple access technologies have been adopted in various telecommunication standards to provide a common protocol that enables different UEs to communicate on a municipal, national, regional, or global level. New Radio (NR), which also may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency-division multiplexing (OFDM) with a cyclic prefix (CP) (CP-OFDM) on the downlink, using CP-OFDM or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation.

SUMMARY

In some aspects, a method of wireless communication performed by a user equipment (UE) includes receiving a resource exclusion configuration for applying at least a first set of resource exclusion thresholds to a selection of sidelink resources for transmitting a sidelink communication, the first set of resource exclusion thresholds being based, at least in part, on one or more modulation and coding schemes (MCSs) or an MCS index; and transmitting the sidelink communication in accordance with the resource exclusion configuration.

In some aspects, a method of wireless communication performed by a network node includes configuring a UE with a resource exclusion configuration for applying at least a first set of resource exclusion thresholds to a selection of sidelink resources for transmitting a sidelink communication, the first set of resource exclusion thresholds being based, at least in part, on one or more MCSs or an MCS index; and configuring the UE to transmit the sidelink communication in accordance with the resource exclusion configuration.

In some aspects, a UE for wireless communication includes one or more memories; and one or more processors, coupled to the one or more memories, configured to cause the UE to: receive a resource exclusion configuration for applying at least a first set of resource exclusion thresholds to a selection of sidelink resources for transmitting a sidelink communication, the first set of resource exclusion thresholds being based, at least in part, on one or more MCSs or an MCS index; and transmit the sidelink communication in accordance with the resource exclusion configuration.

In some aspects, a network node for wireless communication includes one or more memories; and one or more processors, coupled to the one or more memories, configured to cause the network node to: configure a UE with a resource exclusion configuration for applying at least a first set of resource exclusion thresholds to a selection of sidelink resources for transmitting a sidelink communication, the first set of resource exclusion thresholds being based, at least in part, on one or more MCSs or an MCS index; and configure the UE to transmit the sidelink communication in accordance with the resource exclusion configuration.

In some aspects, a non-transitory computer-readable medium storing a set of instructions for wireless communication includes one or more instructions that, when executed by one or more processors of a UE, cause the UE to: receive a resource exclusion configuration for applying at least a first set of resource exclusion thresholds to a selection of sidelink resources for transmitting a sidelink communication, the first set of resource exclusion thresholds being based, at least in part, on one or more MCSs or an MCS index; and transmit the sidelink communication in accordance with the resource exclusion configuration.

In some aspects, a non-transitory computer-readable medium storing a set of instructions for wireless communication includes one or more instructions that, when executed by one or more processors of a network node, cause the network node to: configure a UE with a resource exclusion configuration for applying at least a first set of resource exclusion thresholds to a selection of sidelink resources for transmitting a sidelink communication, the first set of resource exclusion thresholds being based, at least in part, on one or more MCSs or an MCS index; and configure the UE to transmit the sidelink communication in accordance with the resource exclusion configuration.

In some aspects, an apparatus for wireless communication includes means for receiving a resource exclusion configuration for applying at least a first set of resource exclusion thresholds to a selection of sidelink resources for transmitting a sidelink communication, the first set of resource exclusion thresholds being based, at least in part, on one or more MCSs or an MCS index; and means for transmitting the sidelink communication in accordance with the resource exclusion configuration.

In some aspects, an apparatus for wireless communication includes means for configuring a UE with a resource exclusion configuration for applying at least a first set of resource exclusion thresholds to a selection of sidelink resources for transmitting a sidelink communication, the first set of resource exclusion thresholds being based, at least in part, on one or more MCSs or an MCS index; and means for configuring the UE to transmit the sidelink communication in accordance with the resource exclusion configuration.

Aspects generally include a method, apparatus, system, computer program product, non-transitory computer-readable medium, user equipment, base station, network entity, network node, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 6 is a diagram illustrating an example associated with resource selection and reservation, in accordance with the present disclosure.

FIG. 9 is a diagram illustrating an example process performed, for example, at a UE or an apparatus of a UE, in accordance with the present disclosure.

FIG. 10 is a diagram illustrating an example process performed, for example, at a network node or an apparatus of a network node, in accordance with the present disclosure.

DETAILED DESCRIPTION

Figure 1:
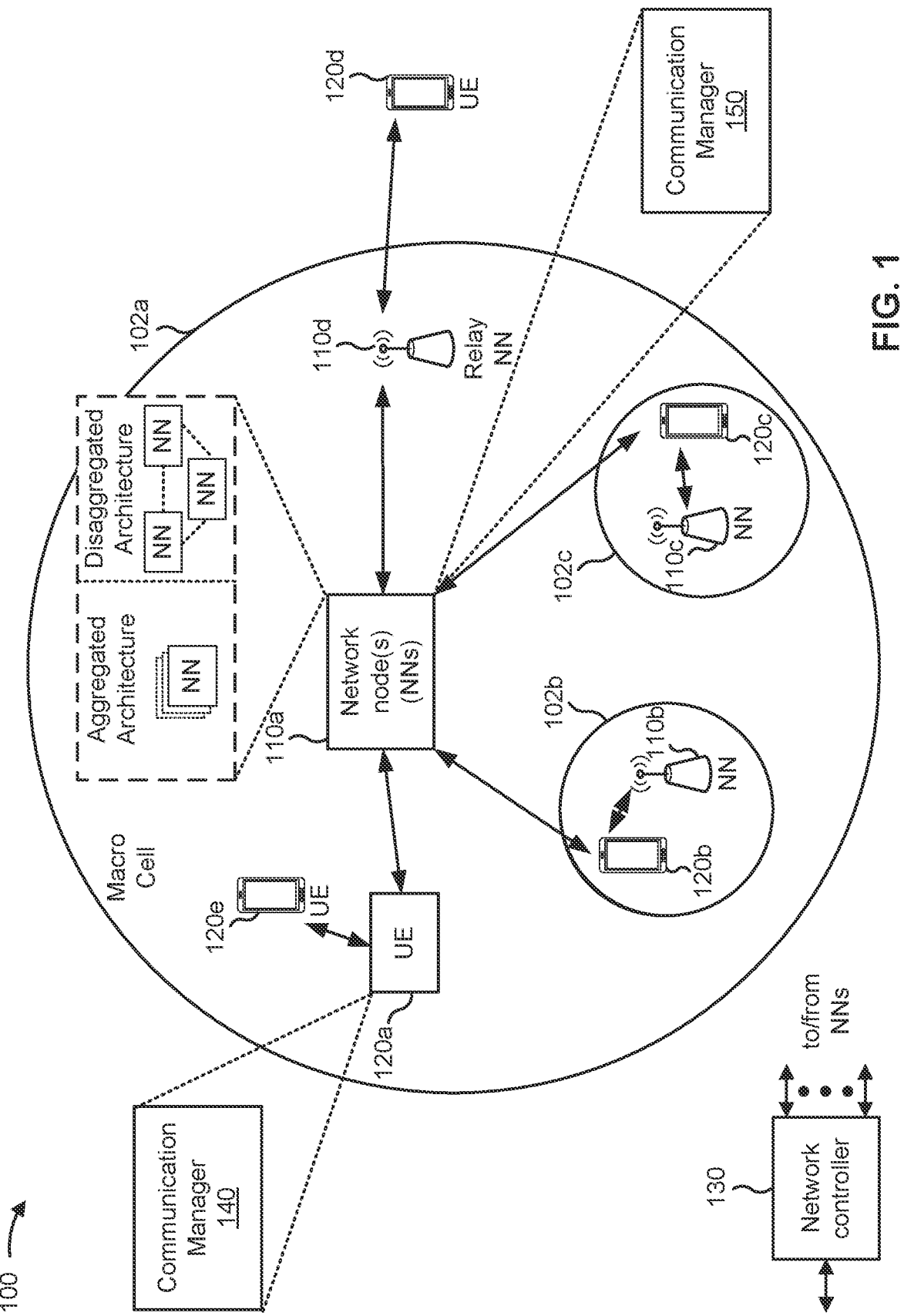
FIG. 1 is a diagram illustrating an example of a wireless network.

Sidelink communication facilitates direct communication between user equipments (UEs) without the need for data to pass through a network node, such as a gNodeB (gNB). A reference signal received power (RSRP) measurement allows, for example, a transmitting UE (Tx UE) to measure a strength of the signals communicated between the Tx UE and a receiving UE (Rx UE). With the RSRP measurements, the Tx UE and/or Rx UE may select resources for sidelink communication with one another. For example, the Tx UE and/or the Rx UE may select resources on symbols with low interference, as indicated by the RSRP measurements.

Signal strength, determined by RSRP measurements, however, may not be sufficient as a standalone criterion for selecting resources for sidelink communications. For example, some sidelink data may be more tolerant to interference than other sidelink data. In particular, not all sidelink data is transmitted using the same modulation and coding scheme (MCS). A higher MCS may need a higher signal-to-interference-plus-noise ratio (SINR) to decode signals. Therefore, using the same criteria for selecting resources for both higher MCS levels and lower MCS levels may be too restrictive (e.g., an unnecessary number of resources are excluded) or not restrictive enough (e.g., resources with too much interference are available for selection).

Various aspects relate generally to adaptive resource exclusion for sidelink communications. Some aspects more specifically relate to adaptive resource exclusion thresholds to be applied during sidelink communications between a Tx UE and an Rx UE. The resource exclusion thresholds may be based, at least in part, on the MCS to be transmitted during the sidelink communication. In some examples, a UE receives a resource exclusion configuration for applying at least a first set of resource exclusion thresholds to a selection of sidelink resources for transmitting a sidelink communication, the first set of resource exclusion thresholds being based, at least in part, on one or more MCSs. In some examples, a network node configures the UE to transmit the sidelink communication in accordance with the resource exclusion configuration.

Particular aspects of the subject matter described in this disclosure can be implemented to realize one or more of the following potential advantages. In some examples, by applying at least a first set of resource exclusion thresholds to a selection of sidelink resources for transmitting a sidelink communication, the described techniques can be used to adaptively select resources so that, for example, packets with higher interference tolerance may use a higher RSRP threshold, leaving more free resources to be used by packets with lower interference tolerance. In some examples, by configuring the UE to transmit sidelink communications in accordance with the resource exclusion configuration, the described techniques can be used to improve the quality of sidelink communications between a Tx UE and an Rx UE.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

FIG. 1 is a diagram illustrating an example of a wireless network 100. The wireless network 100 may be or may include elements of a 5G (for example, NR) network or a 4G (for example, Long Term Evolution (LTE)) network, among other examples. The wireless network 100 may include one or more network nodes 110 (shown as a network node 110a, a network node 110b, a network node 110c, and a network node 110d), a UE 120 or multiple UEs 120 (shown as a UE 120a, a UE 120b, a UE 120c, a UE 120d, and a UE 120e), or other entities. A network node 110 is an example of a network node that communicates with UEs 120. As shown, a network node 110 may include one or more network nodes. For example, a network node 110 may be an aggregated network node, meaning that the aggregated network node is configured to utilize a radio protocol stack that is physically or logically integrated within a single RAN node (for example, within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUS)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, and/or one or more DUs. A network node 110 may include, for example, an NR base station, an LTE base station, a Node B, an eNB (for example, in 4G), a gNB (for example, in 5G), an access point, or a transmission reception point (TRP), a DU, an RU, a CU, a mobility element of a network, a core network node, a network element, a network equipment, a RAN node, or a combination thereof. In some examples, the network nodes 110 may be interconnected to one another or to one or more other network nodes 110 in the wireless network 100 through various types of fronthaul, midhaul, and/or backhaul interfaces, such as a direct physical connection, an air interface, or a virtual network, using any suitable transport network.

In some examples, a network node 110 may provide communication coverage for a particular geographic area. In the Third Generation Partnership Project (3GPP), the term "cell" can refer to a coverage area of a network node 110 or a network node subsystem serving this coverage area, depending on the context in which the term is used. A network node 110 may provide communication coverage for a macro cell, a pico cell, a femto cell, or another type of cell. A macro cell may cover a relatively large geographic area (for example, several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (for example, a home) and may allow restricted access by UEs 120 having association with the femto cell (for example, UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In the example shown in FIG. 1, the network node 110a may be a macro network node for a macro cell 102a, the network node 110b may be a pico network node for a pico cell 102b, and the network node 110c may be a femto network node for a femto cell 102c. A network node may support one or multiple (for example, three) cells. In some examples, a cell may not necessarily be stationary, and the geographic area of the cell may move according to the location of a network node 110 that is mobile (for example, a mobile network node).

In some aspects, the terms "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), or a Non-Real Time (Non-RT) RIC, or a combination thereof. In some aspects, the terms "base station" or "network node" may refer to one device configured to perform one or more functions, such as those described herein in connection with the network node 110. In some aspects, the terms "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the terms "base station" or "network node" may refer to any one or more of those different devices. In some aspects, the terms "base station" or "network node" may refer to one or more virtual base stations or one or more virtual base station functions. For example, in some aspects, two or more base station functions may be instantiated on a single device. In some aspects, the terms "base station" or "network node" may refer to one of the base station functions and not another. In this way, a single device may include more than one base station.

The wireless network 100 may include one or more relay stations. A relay station is a network node that can receive a transmission of data from an upstream node (for example, a network node 110 or a UE 120) and send a transmission of the data to a downstream node (for example, a UE 120 or a network node 110). A relay station may be a UE 120 that can relay transmissions for other UEs 120. In the example shown in FIG. 1, the network node 110d (for example, a relay network node) may communicate with the network node 110a (for example, a macro network node) and the UE 120d in order to facilitate communication between the network node 110a and the UE 120d. A network node 110 that relays communications may be referred to as a relay station, a relay base station, a relay network node, a relay node, or a relay, among other examples.

The wireless network 100 may be a heterogeneous network that includes network nodes 110 of different types, such as macro network nodes, pico network nodes, femto network nodes, or relay network nodes. These different types of network nodes 110 may have different transmit power levels, different coverage areas, or different impacts on interference in the wireless network 100. For example, macro network nodes may have a high transmit power level (for example, 5 to 40 watts) whereas pico network nodes, femto network nodes, and relay network nodes may have lower transmit power levels (for example, 0.1 to 2 watts).

A network controller 130 may couple to or communicate with a set of network nodes 110 and may provide coordination and control for these network nodes 110. The network controller 130 may communicate with the network nodes 110 via a backhaul communication link or a midhaul communication link. The network nodes 110 may communicate with one another directly or indirectly via a wireless or wireline backhaul communication link. In some aspects, the network controller 130 may be a CU or a core network device, or may include a CU or a core network device.

The UEs 120 may be dispersed throughout the wireless network 100, and each UE 120 may be stationary or mobile. A UE 120 may include, for example, an access terminal, a terminal, a mobile station, or a subscriber unit. A UE 120 may be a cellular phone (for example, a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (for example, a smart watch, smart clothing, smart glasses, a smart wristband, smart jewelry (for example, a smart ring or a smart bracelet)), an entertainment device (for example, a music device, a video device, or a satellite radio), a vehicular component or sensor, a smart meter/sensor, industrial manufacturing equipment, a global positioning system device, a UE function of a network node, or any other suitable device that is configured to communicate via a wireless or wired medium.

Some UEs 120 may be considered machine-type communication (MTC) or evolved or enhanced machine-type communication (eMTC) UEs. An MTC UE or an eMTC UE may include, for example, a robot, an unmanned aerial vehicle, a remote device, a sensor, a meter, a monitor, or a location tag, that may communicate with a network node, another device (for example, a remote device), or some other entity. Some UEs 120 may be considered Internet-of-Things (IoT) devices, or may be implemented as NB-IoT (narrowband IoT) devices. Some UEs 120 may be considered a Customer Premises Equipment. A UE 120 may be included inside a housing that houses components of the UE 120, such as processor components or memory components. In some examples, the processor components and the memory components may be coupled together. For example, the processor components (for example, one or more processors) and the memory components (for example, a memory) may be operatively coupled, communicatively coupled, electronically coupled, or electrically coupled.

In general, any number of wireless networks 100 may be deployed in a given geographic area. Each wireless network 100 may support a particular RAT and may operate on one or more frequencies. A RAT may be referred to as a radio technology or an air interface. A frequency may be referred to as a carrier or a frequency channel. Each frequency may support a single RAT in a given geographic area in order to avoid interference between wireless networks of different RATs. In some cases, NR or 5G RAT networks may be deployed.

In some examples, two or more UEs 120 (for example, shown as UE 120a and UE 120e) may communicate directly using one or more sidelink channels (for example, without using a network node 110 as an intermediary to communicate with one another). For example, the UEs 120 may communicate using peer-to-peer (P2P) communications, device-to-device (D2D) communications, a vehicle-to-everything (V2X) protocol (for example, which may include a vehicle-to-vehicle (V2V) protocol, a vehicle-to-infrastructure (V2I) protocol, or a vehicle-to-pedestrian (V2P) protocol), or a mesh network. In such examples, a UE 120 may perform scheduling operations, resource selection operations, or other operations described elsewhere herein as being performed by the network node 110.

Devices of the wireless network 100 may communicate using the electromagnetic spectrum, which may be subdivided by frequency or wavelength into various classes, bands, or channels. For example, devices of the wireless network 100 may communicate using one or more operating bands. In 5G NR, two initial operating bands have been identified as frequency range designations FR1 (410 MHZ-7.125 GHz) and FR2 (24.25 GHz-52.6 GHz). Although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHZ-24.25 GHZ). Frequency bands falling within FR3 may inherit FR1 characteristics or FR2 characteristics, and thus may effectively extend features of FR1 or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHZ-71 GHZ), FR4 (52.6 GHz-114.25 GHZ), and FR5 (114.25 GHZ-300 GHz). Each of these higher frequency bands falls within the EHF band.

With these examples in mind, unless specifically stated otherwise, the term "sub-6 GHZ," if used herein, may broadly represent frequencies that may be less than 6 GHz, may be within FR1, or may include mid-band frequencies. Further, unless specifically stated otherwise, the term "millimeter wave," if used herein, may broadly represent frequencies that may include mid-band frequencies, may be within FR2, FR4, FR4-a or FR4-1, or FR5, or may be within the EHF band. It is contemplated that the frequencies included in these operating bands (for example, FR1, FR2, FR3, FR4, FR4-a, FR4-1, or FR5) may be modified, and techniques described herein are applicable to those modified frequency ranges.

In some aspects, the UE 120 may include a communication manager 140. As described in more detail elsewhere herein, the communication manager 140 may receive a resource exclusion configuration for applying at least a first set of resource exclusion thresholds to a selection of sidelink resources for transmitting a sidelink communication, the first set of resource exclusion thresholds being based, at least in part, on one or more MCSs or an MCS index; and transmit the sidelink communication in accordance with the resource exclusion configuration. Additionally, or alternatively, the communication manager 140 may perform one or more other operations described herein.

In some aspects, the network node 110 may include a communication manager 150. As described in more detail elsewhere herein, the communication manager 150 may configure a UE 120 with a resource exclusion configuration for applying at least a first set of resource exclusion thresholds to a selection of sidelink resources for transmitting a sidelink communication, the first set of resource exclusion thresholds being based, at least in part, on one or more MCSs or an MCS index; and configure the UE 120 to transmit the sidelink communication in accordance with the resource exclusion configuration. Additionally, or alternatively, the communication manager 150 may perform one or more other operations described herein.

As indicated above, FIG. 1 is provided as an example. Other examples may differ from what is described with regard to FIG. 1.

Figure 2:
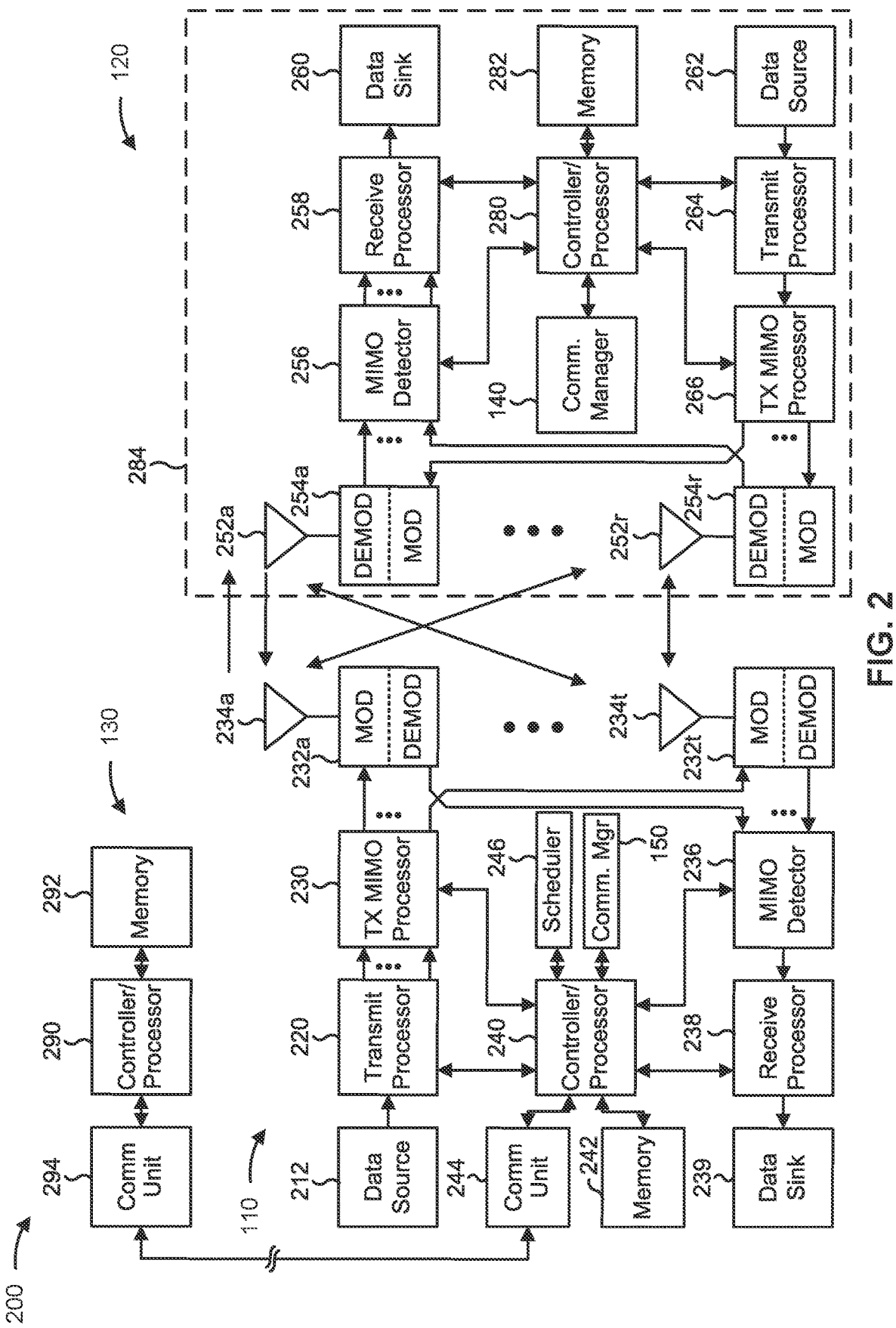
FIG. 2 is a diagram illustrating an example of a network node in communication with a user equipment (UE) in a wireless network.

FIG. 2 is a diagram illustrating an example 200 of a network node 110 in communication with a UE 120 in a wireless network 100. The network node 110 may be equipped with a set of antennas 234a through 234t, such as T antennas (T≥1). The UE 120 may be equipped with a set of antennas 252a through 252r, such as R antennas (R≥1). The network node 110 of example 200 includes one or more radio frequency components, such as antennas 234 and a modem 232. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more MCSs for the UE 120 using one or more channel quality indicators (CQIs) received from that UE 120. The network node 110 may process (for example, encode and modulate) the data for the UE 120 using the MCS(s) selected for the UE 120 and may provide data symbols for the UE 120. The transmit processor 220 may process system information (for example, for semi-static resource partitioning information (SRPI)) and control information (for example, CQI requests, grants, or upper layer signaling) and provide overhead symbols and control symbols. The transmit processor 220 may generate reference symbols for reference signals (for example, a cell-specific reference signal (CRS) or a demodulation reference signal (DMRS)) and synchronization signals (for example, a primary synchronization signal (PSS) or a secondary synchronization signal (SSS)). A transmit (TX) multiple-input multiple-output (MIMO) processor 230 may perform spatial processing (for example, precoding) on the data symbols, the control symbols, the overhead symbols, or the reference symbols, if applicable, and may provide a set of output symbol streams (for example, T output symbol streams) to a corresponding set of modems 232 (for example, T modems), shown as modems 232a through 232t. For example, each output symbol stream may be provided to a modulator component (shown as MOD) of a modem 232. Each modem 232 may use a respective modulator component to process a respective output symbol stream (for example, for OFDM) to obtain an output sample stream. Each modem 232 may further use a respective modulator component to process (for example, convert to analog, amplify, filter, or upconvert) the output sample stream to obtain a downlink signal. The modems 232a through 232t may transmit a set of downlink signals (for example, T downlink signals) via a corresponding set of antennas 234 (for example, T antennas), shown as antennas 234a through 234t.

At the UE 120, a set of antennas 252 (shown as antennas 252a through 252r) may receive the downlink signals from the network node 110 or other network nodes 110 and may provide a set of received signals (for example, R received signals) to a set of modems 254 (for example, R modems), shown as modems 254a through 254r. For example, each received signal may be provided to a demodulator component (shown as DEMOD) of a modem 254. Each modem 254 may use a respective demodulator component to condition (for example, filter, amplify, downconvert, or digitize) a received signal to obtain input samples. Each modem 254 may use a demodulator component to further process the input samples (for example, for OFDM) to obtain received symbols. A MIMO detector 256 may obtain received symbols from the modems 254, may perform MIMO detection on the received symbols if applicable, and may provide detected symbols. A receive processor 258 may process (for example, demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine an RSRP parameter, a received signal strength indicator (RSSI) parameter, a reference signal received quality (RSRQ) parameter, or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (for example, antennas 234*a* through 234*t* or antennas 252*a* through 252*r*) may include, or may be included within, one or more antenna panels, one or more antenna groups, one or more sets of antenna elements, or one or more antenna arrays, among other examples. An antenna panel, an antenna group, a set of antenna elements, or an antenna array may include one or more antenna elements (within a single housing or multiple housings), a set of coplanar antenna elements, a set of non-coplanar antenna elements, or one or more antenna elements coupled to one or more transmission or reception components, such as one or more components of FIG. 2.

On the uplink, at the UE 120, a transmit processor 264 may receive and process data from a data source 262 and control information (for example, for reports that include RSRP, RSSI, RSRQ, or CQI) from the controller/processor 280. The transmit processor 264 may generate reference symbols for one or more reference signals. The symbols from the transmit processor 264 may be precoded by a TX MIMO processor 266 if applicable, further processed by the modems 254 (for example, for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, or the TX MIMO processor 266. The transceiver may be used by a processor (for example, the controller/processor 280) and the memory 282 to perform aspects of any of the processes described herein (e.g., with reference to FIGS. 4-12).

At the network node 110, the uplink signals from UE 120 or other UEs may be received by the antennas 234, processed by the modem 232 (for example, a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, or the TX MIMO processor 230. The transceiver may be used by a processor (for example, the controller/processor 240) and the memory 242 to perform aspects of any of the processes described herein (e.g., with reference to FIGS. 4-12).

In some aspects, the controller/processor 280 may be a component of a processing system. A processing system may generally be a system or a series of machines or components that receives inputs and processes the inputs to produce a set of outputs (which may be passed to other systems or components of, for example, the UE 120). For example, a processing system of the UE 120 may be a system that includes the various other components or subcomponents of the UE 120.

The processing system of the UE 120 may interface with one or more other components of the UE 120, may process information received from one or more other components (such as inputs or signals), or may output information to one or more other components. For example, a chip or modem of the UE 120 may include a processing system, a first interface to receive or obtain information, and a second interface to output, transmit, or provide information. In some examples, the first interface may be an interface between the processing system of the chip or modem and a receiver, such that the UE 120 may receive information or signal inputs, and the information may be passed to the processing system. In some examples, the second interface may be an interface between the processing system of the chip or modem and a transmitter, such that the UE 120 may transmit information output from the chip or modem. A person having ordinary skill in the art will readily recognize that the second interface also may obtain or receive information or signal inputs, and the first interface also may output, transmit, or provide information.

In some aspects, the controller/processor 240 may be a component of a processing system. A processing system may generally be a system or a series of machines or components that receives inputs and processes the inputs to produce a set of outputs (which may be passed to other systems or components of, for example, the network node 110). For example, a processing system of the network node 110 may be a system that includes the various other components or subcomponents of the network node 110.

The processing system of the network node 110 may interface with one or more other components of the network node 110, may process information received from one or more other components (such as inputs or signals), or may output information to one or more other components. For example, a chip or modem of the network node 110 may include a processing system, a first interface to receive or obtain information, and a second interface to output, transmit, or provide information. In some examples, the first interface may be an interface between the processing system of the chip or modem and a receiver, such that the network node 110 may receive information or signal inputs, and the information may be passed to the processing system. In some examples, the second interface may be an interface between the processing system of the chip or modem and a transmitter, such that the network node 110 may transmit information output from the chip or modem. A person having ordinary skill in the art will readily recognize that the second interface also may obtain or receive information or signal inputs, and the first interface also may output, transmit, or provide information.

The controller/processor 240 of the network node 110, the controller/processor 280 of the UE 120, or any other component(s) of FIG. 2 may perform one or more techniques associated with adaptive resource selection for sidelink communications, as described in more detail elsewhere herein. For example, the controller/processor 240 of the network node 110, the controller/processor 280 of the UE 120, or any other component(s) (or combinations of components) of FIG. 2 may perform or direct operations of, for example, process 900 of FIG. 9, process 1000 of FIG. 10, and/or other processes as described herein. The memory 242 and the memory 282 may store data and program codes for the network node 110 and the UE 120, respectively. In some examples, the memory 242 and the memory 282 may include a non-transitory computer-readable medium storing one or more instructions (for example, code or program code) for wireless communication. For example, the one or more instructions, when executed (for example, directly, or after compiling, converting, or interpreting) by one or more processors of the network node 110 or the UE 120, may cause the one or more processors, the UE 120, or the network node 110 to perform or direct operations of, for example, process 900 of FIG. 9, process 1000 of FIG. 10, and/or other processes as described herein. In some examples, executing instructions may include running the instructions, converting the instructions, compiling the instructions, and/or interpreting the instructions, among other examples.

In some aspects, the UE 120 includes means for receiving a resource exclusion configuration for applying at least a first set of resource exclusion thresholds to a selection of sidelink resources for transmitting a sidelink communication, the first set of resource exclusion thresholds being based, at least in part, on one or more MCSs or an MCS index; and/or means for transmitting the sidelink communication in accordance with the resource exclusion configuration. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the network node 110 includes means for configuring a UE 120 with a resource exclusion configuration for applying at least a first set of resource exclusion thresholds to a selection of sidelink resources for transmitting a sidelink communication, the first set of resource exclusion thresholds being based, at least in part, on one or more MCSs or an MCS index; and/or means for configuring the UE 120 to transmit the sidelink communication in accordance with the resource exclusion configuration. The means for the network node 110 to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

In some aspects, an individual processor may perform all of the functions described as being performed by the one or more processors. In some aspects, one or more processors may collectively perform a set of functions. For example, a first set of (one or more) processors of the one or more processors may perform a first function described as being performed by the one or more processors, and a second set of (one or more) processors of the one or more processors may perform a second function described as being performed by the one or more processors. The first set of processors and the second set of processors may be the same set of processors or may be different sets of processors. Reference to "one or more processors" should be understood to refer to any one or more of the processors described in connection with FIG. 2. Reference to "one or more memories" should be understood to refer to any one or more memories of a corresponding device, such as the memory described in connection with FIG. 2. For example, functions described as being performed by one or more memories can be performed by the same subset of the one or more memories or different subsets of the one or more memories.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR base station, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station (e.g., an aggregated network node) may be configured to utilize a radio protocol stack that is physically or logically integrated within a single RAN node (for example, within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU, and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
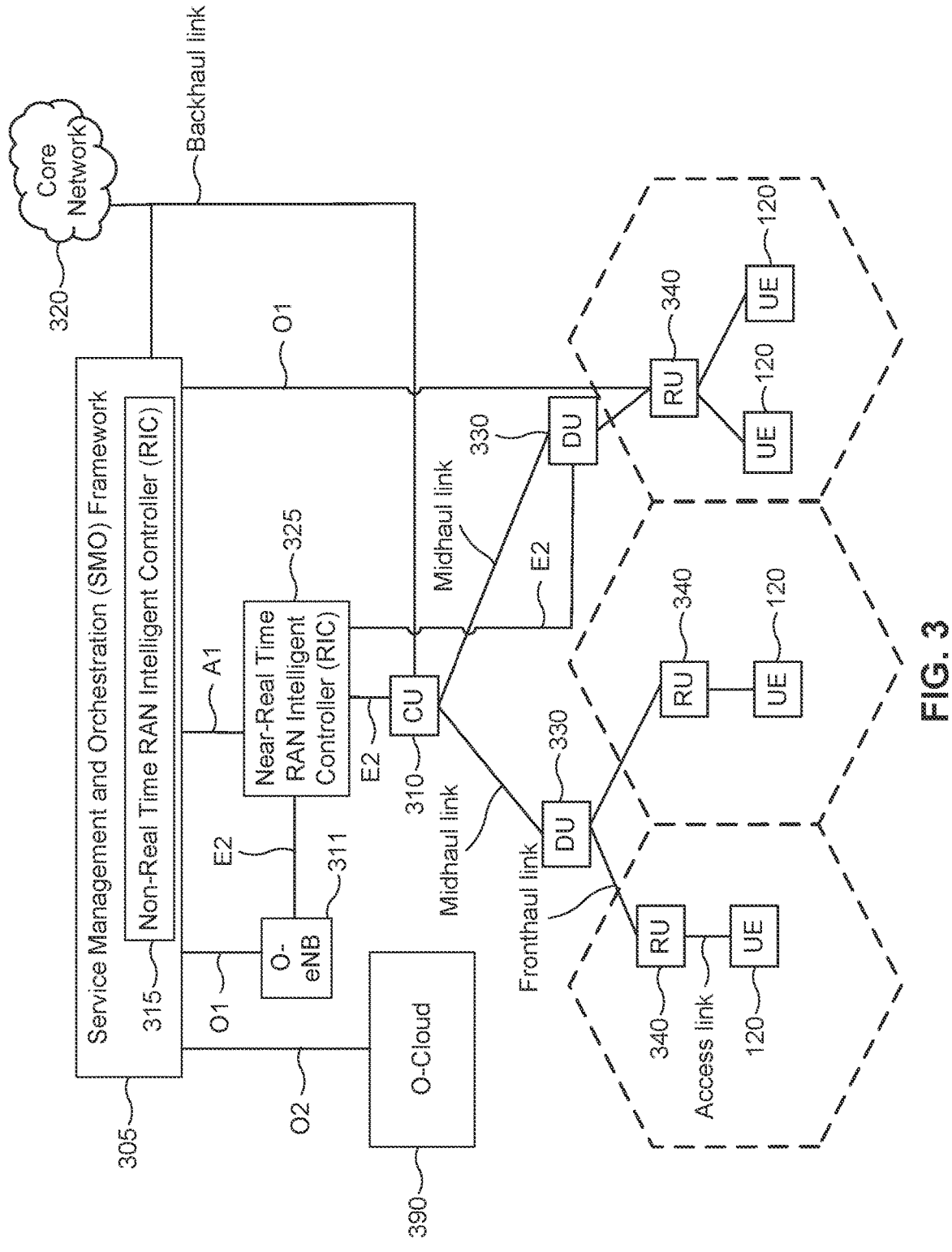
FIG. 3 is a diagram illustrating an example disaggregated base station architecture, in accordance with the present disclosure.

FIG. 3 is a diagram illustrating an example disaggregated base station architecture 300, in accordance with the present disclosure. The disaggregated base station architecture 300 may include a CU 310 that can communicate directly with a core network 320 via a backhaul link, or indirectly with the core network 320 through one or more disaggregated control units (such as a Near-RT RIC 325 via an E2 link, or a Non-RT RIC 315 associated with a Service Management and Orchestration (SMO) Framework 305, or both). A CU 310 may communicate with one or more DUs 330 via respective midhaul links, such as through F1 interfaces. Each of the DUs 330 may communicate with one or more RUs 340 via respective fronthaul links. Each of the RUs 340 may communicate with one or more UEs 120 via respective radio frequency (RF) access links. In some implementations, a UE 120 may be simultaneously served by multiple RUs 340.

Each of the units, including the CUS 310, the DUs 330, the RUs 340, as well as the Near-RT RICs 325, the Non-RT RICs 315, and the SMO Framework 305, may include one or more interfaces or be coupled with one or more interfaces configured to receive or transmit signals, data, or information (collectively, signals) via a wired or wireless transmission medium. Each of the units, or an associated processor or controller providing instructions to one or multiple communication interfaces of the respective unit, can be configured to communicate with one or more of the other units via the transmission medium. In some examples, each of the units can include a wired interface, configured to receive or transmit signals over a wired transmission medium to one or more of the other units, and a wireless interface, which may include a receiver, a transmitter or transceiver (such as a RF transceiver), configured to receive or transmit signals, or both, over a wireless transmission medium to one or more of the other units.

In some aspects, the CU 310 may host one or more higher layer control functions. Such control functions can include RRC functions, packet data convergence protocol (PDCP) functions, or service data adaptation protocol (SDAP) functions, among other examples. Each control function can be implemented with an interface configured to communicate signals with other control functions hosted by the CU 310. The CU 310 may be configured to handle user plane functionality (for example, Central Unit-User Plane (CU-UP) functionality), control plane functionality (for example, Central Unit-Control Plane (CU-CP) functionality), or a combination thereof. In some implementations, the CU 310 can be logically split into one or more CU-UP units and one or more CU-CP units. A CU-UP unit can communicate bidirectionally with a CU-CP unit via an interface, such as the E1 interface when implemented in an O-RAN configuration. The CU 310 can be implemented to communicate with a DU 330, as necessary, for network control and signaling.

Each DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers depending, at least in part, on a functional split, such as a functional split defined by the 3GPP. In some aspects, the one or more high PHY layers may be implemented by one or more modules for forward error correction (FEC) encoding and decoding, scrambling, and modulation and demodulation, among other examples. In some aspects, the DU 330 may further host one or more low PHY layers, such as implemented by one or more modules for a fast Fourier transform (FFT), an inverse FFT (iFFT), digital beamforming, or physical random access channel (PRACH) extraction and filtering, among other examples. Each layer (which also may be referred to as a module) can be implemented with an interface configured to communicate signals with other layers (and modules) hosted by the DU 330, or with the control functions hosted by the CU 310.

Each RU 340 may implement lower-layer functionality. In some deployments, an RU 340, controlled by a DU 330, may correspond to a logical node that hosts RF processing functions or low-PHY layer functions, such as performing an FFT, performing an iFFT, digital beamforming, or PRACH extraction and filtering, among other examples, based on a functional split (for example, a functional split defined by the 3GPP), such as a lower layer functional split. In such an architecture, each RU 340 can be operated to handle over the air (OTA) communication with one or more UEs 120. In some implementations, real-time and non-real-time aspects of control and user plane communication with the RU(s) 340 can be controlled by the corresponding DU 330. In some scenarios, this configuration can enable each DU 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements, which may be managed via an operations and maintenance interface (such as an O1 interface). For virtualized network elements, the SMO Framework 305 may be configured to interact with a cloud computing platform (such as an open cloud (O-Cloud) platform 390) to perform network element life cycle management (such as to instantiate virtualized network elements) via a cloud computing platform interface (such as an O2 interface). Such virtualized network elements can include, but are not limited to, CUs 310, DUs 330, RUs 340, non-RT RICs 315, and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with each of one or more RUs 340 via a respective O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an AI interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via an O1 interface) or via creation of RAN management policies (such as A1 interface policies).

As indicated above, FIG. 3 is provided as an example. Other examples may differ from what is described with regard to FIG. 3.

Figure 4:
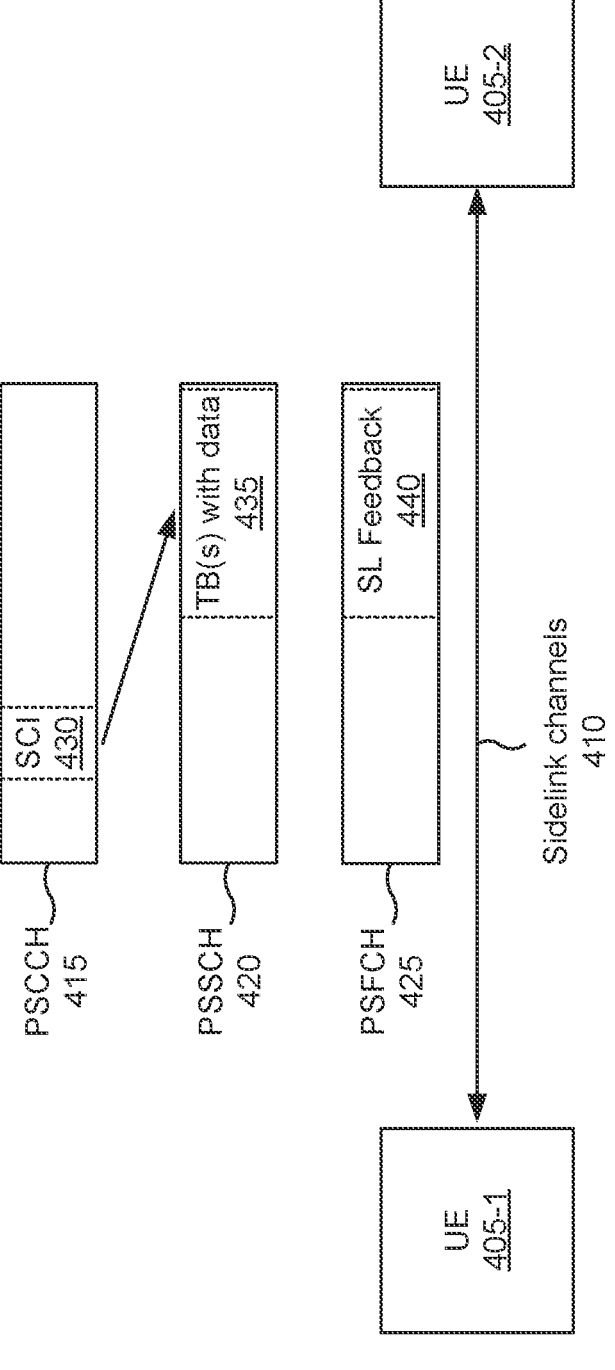
FIG. 4 is a diagram illustrating an example of sidelink communications, in accordance with the present disclosure.

FIG. 4 is a diagram illustrating an example 400 of sidelink communications, in accordance with the present disclosure.

As shown in FIG. 4, a first UE 405-1 may communicate with a second UE 405-2 (and one or more other UEs 405) via one or more sidelink channels 410. The UEs 405-1 and 405-2 may communicate using the one or more sidelink channels 410 for P2P communications, D2D communications, V2X communications (e.g., which may include V2V communications, V2I communications, and/or V2P communications) and/or mesh networking. In some aspects, the UEs 405 (e.g., UE 405-1 and/or UE 405-2) may correspond to one or more other UEs described elsewhere herein, such as UE 120. In some aspects, the one or more sidelink channels 410 may use a PC5 interface and/or may operate in a high frequency band (e.g., the 5.9 GHz band). Additionally, or alternatively, the UEs 405 may synchronize timing of transmission time intervals (TTIs) (e.g., frames, subframes, slots, or symbols) using global navigation satellite system (GNSS) timing.

As further shown in FIG. 4, the one or more sidelink channels 410 may include a physical sidelink control channel (PSCCH) 415, a physical sidelink shared channel (PSSCH) 420, and/or a physical sidelink feedback channel (PSFCH) 425. The PSCCH 415 may be used to communicate control information, similar to a physical downlink control channel (PDCCH) and/or a physical uplink control channel (PUCCH) used for cellular communications with a network node 110 via an access link or an access channel. The PSSCH 420 may be used to communicate data, similar to a physical downlink shared channel (PDSCH) and/or a physical uplink shared channel (PUSCH) used for cellular communications with a network node 110 via an access link or an access channel. For example, the PSCCH 415 may carry sidelink control information (SCI) 430, which may indicate various control information used for sidelink communications, such as one or more resources (e.g., time resources, frequency resources, and/or spatial resources) where a transport block (TB) 435 may be carried on the PSSCH 420. The TB 435 may include data. The PSFCH 425 may be used to communicate sidelink feedback 440, such as hybrid automatic repeat request (HARQ) feedback (e.g., acknowledgement or negative acknowledgement (ACK/NACK) information), transmit power control (TPC), and/or a scheduling request (SR).

Although shown on the PSCCH 415, in some aspects, the SCI 430 may include multiple communications in different stages, such as a first stage SCI (SCI-1) and a second stage SCI (SCI-2). The SCI-1 may be transmitted on the PSCCH 415. The SCI-2 may be transmitted on the PSSCH 420. The SCI-1 may include, for example, an indication of one or more resources (e.g., time resources, frequency resources, and/or spatial resources) on the PSSCH 420, information for decoding sidelink communications on the PSSCH, a quality of service (QOS) priority value, a resource reservation period, a PSSCH demodulation reference signal (DMRS) pattern, an SCI format for the SCI-2, a beta offset for the SCI-2, a quantity of PSSCH DMRS ports, and/or an MCS. The SCI-2 may include information associated with data transmissions on the PSSCH 420, such as a hybrid automatic repeat request (HARQ) process ID, a new data indicator (NDI), a source identifier, a destination identifier, and/or a channel state information (CSI) report trigger.

In some aspects, the one or more sidelink channels 410 may use resource pools. For example, a scheduling assignment (e.g., included in SCI 430) may be transmitted in sub-channels using specific resource blocks (RBs) across time. In some aspects, data transmissions (e.g., on the PSSCH 420) associated with a scheduling assignment may occupy adjacent RBs in the same subframe as the scheduling assignment (e.g., using frequency division multiplexing). In some aspects, a scheduling assignment and associated data transmissions are not transmitted on adjacent RBs.

In some aspects, a UE 405 may operate using a sidelink transmission mode (e.g., Mode 1) where resource selection and/or scheduling is performed by a network node 110 (e.g., a base station, a CU, or a DU). For example, the UE 405 may receive a grant (e.g., in downlink control information (DCI) or in a radio resource control (RRC) message, such as for configured grants) from the network node 110 (e.g., directly or via one or more network nodes) for sidelink channel access and/or scheduling. In some aspects, a UE 405 may operate using a transmission mode (e.g., Mode 2) where resource selection and/or scheduling is performed by the UE 405 (e.g., rather than a network node 110). In some aspects, the UE 405 may perform resource selection and/or scheduling by sensing channel availability for transmissions. For example, the UE 405 may measure a received signal strength indicator (RSSI) parameter (e.g., a sidelink-RSSI (S-RSSI) parameter) associated with various sidelink channels, may measure an RSRP parameter (e.g., a PSSCH-RSRP parameter) associated with various sidelink channels, and/or may measure a reference signal received quality (RSRQ) parameter (e.g., a PSSCH-RSRQ parameter) associated with various sidelink channels, and may select a channel for transmission of a sidelink communication based at least in part on the measurement(s).

Additionally, or alternatively, the UE 405 may perform resource selection and/or scheduling using SCI 430 received in the PSCCH 415, which may indicate occupied resources and/or channel parameters. Additionally, or alternatively, the UE 405 may perform resource selection and/or scheduling by determining a channel busy ratio (CBR) associated with various sidelink channels, which may be used for rate control (e.g., by indicating a maximum number of resource blocks that the UE 405 can use for a particular set of subframes).

In the transmission mode where resource selection and/or scheduling is performed by a UE 405, the UE 405 may generate sidelink grants, and may transmit the grants in SCI 430. A sidelink grant may indicate, for example, one or more parameters (e.g., transmission parameters) to be used for an upcoming sidelink transmission, such as one or more resource blocks to be used for the upcoming sidelink transmission on the PSSCH 420 (e.g., for TBs 435), one or more subframes to be used for the upcoming sidelink transmission, and/or an MCS to be used for the upcoming sidelink transmission. In some aspects, a UE 405 may generate a sidelink grant that indicates one or more parameters for semi-persistent scheduling (SPS), such as a periodicity of a sidelink transmission. Additionally, or alternatively, the UE 405 may generate a sidelink grant for event-driven scheduling, such as for an on-demand sidelink message.

As discussed in further detail below with respect to FIGS. 6-7, the Tx UE (e.g., UE 405-1) may select resources for the sidelink communications based, at least in part, on the MCS of the data to be transmitted, a priority of the data to be transmitted, and/or a combination thereof, among other examples. For example, the Tx UE may select resources based, at least in part, on a resource exclusion threshold set in accordance with the MCS and/or the priority of the data to be transmitted.

As indicated above, FIG. 4 is provided as an example. Other examples may differ from what is described with respect to FIG. 4.

Figure 5:
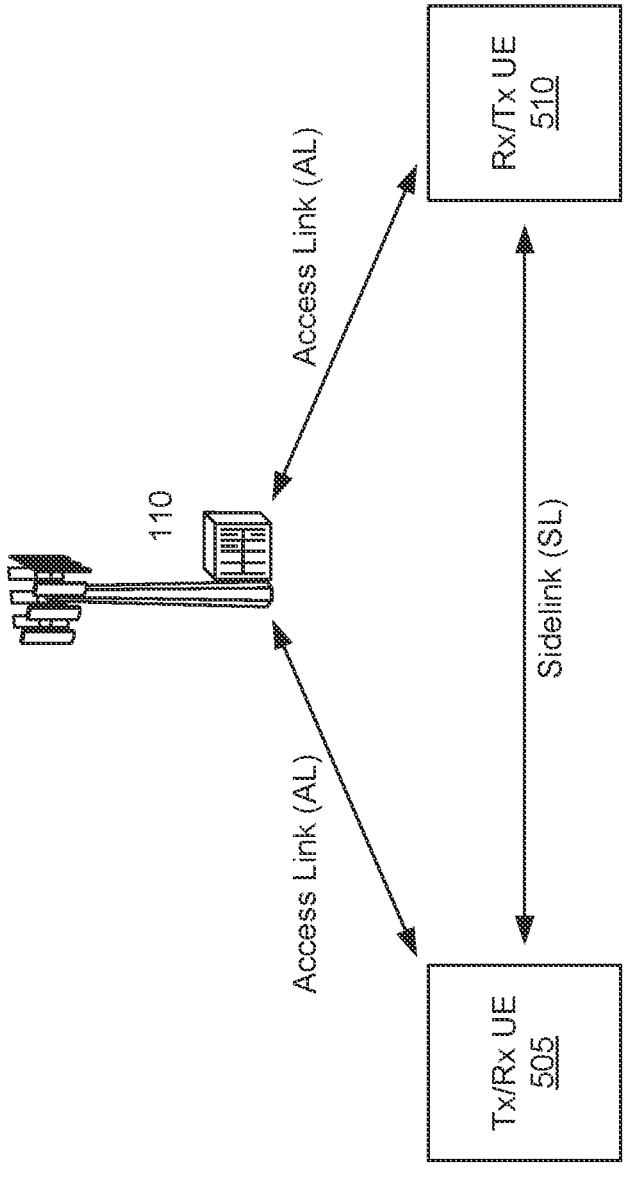
FIG. 5 is a diagram illustrating an example of sidelink communications and access link communications, in accordance with the present disclosure.

FIG. 5 is a diagram illustrating an example 500 of sidelink communications and access link communications, in accordance with the present disclosure.

As shown in FIG. 5, a transmitter (Tx)/receiver (Rx) UE 505 and an Rx/Tx UE 510 may communicate with one another via a sidelink, as described above in connection with FIG. 4. As further shown, in some sidelink modes, a network node 110 may communicate with the Tx/Rx UE 505 (e.g., directly or via one or more network nodes), such as via a first access link. Additionally, or alternatively, in some sidelink modes, the network node 110 may communicate with the Rx/Tx UE 510 (e.g., directly or via one or more network nodes), such as via a first access link. The Tx/Rx UE 505 and/or the Rx/Tx UE 510 may correspond to one or more UEs described elsewhere herein, such as the UE 120 of FIG. 1. Thus, a direct link between UEs 120 (e.g., via a PC5 interface) may be referred to as a sidelink, and a direct link between a network 110 and a UE 120 (e.g., via a Uu interface) may be referred to as an access link. Sidelink communications may be transmitted via the sidelink, and access link communications may be transmitted via the access link. An access link communication may be either a downlink communication (from a network node 110 to a UE 120) or an uplink communication (from a UE 120 to a network node 110).

The network node 110 may transmit, and the Tx/Rx UE 505 may receive, a resource exclusion configuration for sidelink communications. The resource exclusion configuration may be transmitted to the Tx/Rx UE 505 via the first access link. The resource exclusion configuration may configure the Tx/Rx UE 505 to select resources for sidelink communications according to, for example, the MCS of the data to be transmitted, the priority of the data to be transmitted, and/or a combination thereof, among other examples, as discussed in greater detail below with respect to FIGS. 6-7.

As indicated above, FIG. 5 is provided as an example. Other examples may differ from what is described with respect to FIG. 5.

FIG. 6 is a diagram illustrating an example 600 associated with resource selection and reservation, in accordance with the present disclosure. The example 600 shows a resource allocation in units of sub-channels in the frequency domain over one slot in the time domain. The resource reservations for transmissions may be made in the current slot and in up to two future slots. Reservation information may be transmitted with SCI. Resource reservations may be made for period and aperiodic resources.

A Tx UE may perform resource selection by identifying candidate resources 605 and selecting from among the identified candidate resources 605. Candidate resources 605 may be identified and/or selected via sensing (such as RSRP measurements), priority of transmitted packets, priority indicated by SCI, and exclusion thresholds, as discussed in greater detail below with respect to example 700 of FIG. 7.

The process of selecting from among the candidate resources 605 may include identifying available resources 610 as shown in the example 600 of FIG. 6. Available resources 610 may include resources that could be used for sidelink communications. Other resources, such as unavailable resources 620, may be excluded as available resources 610. Some resources may be unavailable because, for example, they are used for other purposes, such as to perform RSRP measurements. Moreover, as discussed in greater detail below with respect to the example 700 of FIG. 7, some resources may be unavailable due to interference, given the priority of the packet to be transmitted, the packet or MSC priority transmitted or indicated via the SCI, the MCS used to transmit the packet and/or the SCI, and/or a combination thereof, among other examples.

In the example 600, the Tx UE may select or reserve resources 615 for sidelink communications with an Rx UE. The selected or reserved resources 615 may be communicated to the Rx UE via SCI.

As indicated above, FIG. 6 is provided as an example. Other examples may differ from what is described with respect to FIG. 6.

Figure 7:
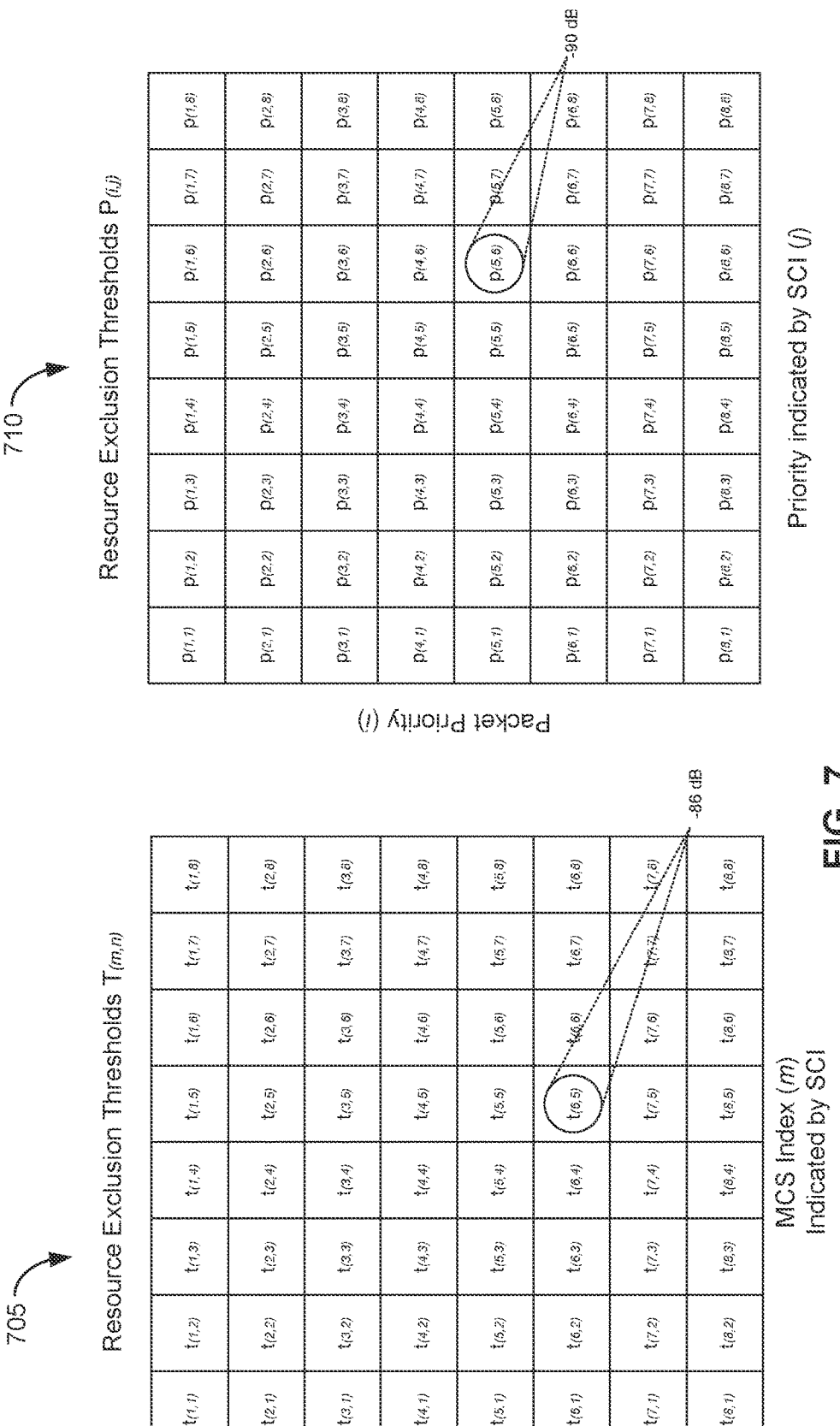
FIG. 7 is a diagram illustrating an example associated with resource exclusion thresholds, in accordance with the present disclosure.

FIG. 7 is a diagram illustrating an example 700 associated with resource exclusion thresholds, in accordance with the present disclosure. The example 700 of FIG. 7 illustrates a first set of resource exclusion thresholds 705 and a second set of resource exclusion thresholds 710, one or both of which may be applied for selecting resources for sidelink communications.

The first set of resource exclusion thresholds 705 may be based, at least in part, on one or more MCSs. For example, the first set of resource exclusion thresholds 705 may be based on a resource exclusion threshold corresponding to an MCS index for packet transmissions m and an MCS index for packet transmissions n, shown in FIG. 7 as an 8×8 matrix $T_{(m,n)}$. The second set of resource exclusion thresholds 710 may be based, at least in part, on one or more transmission priorities. For example, the second set of resource exclusion thresholds 710 may be based on a resource exclusion threshold corresponding to a packet priority index i and an SCI priority index j (i.e., priority indicated by SCI), shown in FIG. 7 as an 8×8 matrix $P_{(i,j)}$.

The resource exclusion threshold corresponding to each of the MCS indices in the matrix $T_{(m,n)}$, each of the transmission priorities in the matrix $P_{(i,j)}$, and/or a combination thereof, among other examples, may include an RSRP threshold. For example, a resource exclusion threshold associated with an MCS index 5 (as indicated by SCI) and a packet transmission with an MCS index of 6, may be located at $t_{(6,5)}$ in the matrix $T_{(m,n)}$. Therefore, each MCS or group of MCSs may be associated with a resource exclusion threshold in the matrix $T_{(m,n)}$. For example, a UE 120 with a transmitting packet associated with index m may exclude any receiving SCI indicating an MCS associated with index n using the threshold at location $t_{(m,n)}$. Further, each MCS index m and/or n may be associated with a single MCS or a group of MCSs. Alternatively or in addition, a resource exclusion threshold associated with a packet priority of 5 and an SCI priority (e.g., a priority indicated by SCI) of 6 may be located at $P_{(5,6)}$ in the matrix $P_{(m,n)}$.

In one example, if MCS 5 is associated with the value at $t_{(1,1)}$, transmissions of packets with MCS 5 may not exclude one another if the measured RSRP is below the value associated with $t_{(1,1)}$ in the matrix $T_{(m,n)}$, which allows for more spatial reuse. Alternatively or in addition, the packet may be transmitted with MCS 19, which may be associated with an index m of 8. In that example, the transmissions may not exclude one another if the measured RSRP is above any of the values associated with $t_{(8,n)}$ (i.e., any of the values in column 8 of the matrix $T_{(m,n)}$.

In some aspects, the resource exclusion threshold may be selected to be a maximum value corresponding to the MCS indices in the matrix $T_{(m,n)}$ and the transmission priorities in the matrix $P_{(i,j)}$ for a particular sidelink communication channel. A sending UE 120 that transmits a packet with priority i and MCS index m may exclude the resources reserved by a receiving SCI indicating a priority j and MCS index n if the measured RSRP is higher than the threshold defined by min $(p_{(i,j)}, t_{(m,n)})$. For example, if the resource exclusion threshold associated with the MCS indices $T_{(m,n)}$ is −90 dB and the resource exclusion threshold associated with the transmission priorities $P_{(i,j)}$ is −86 dB, the selected resource exclusion threshold may be −90 dB, because the absolute value of −90 dB is greater than the absolute value of −86 dB (e.g., min $(p_{(5,6)}, t_{(6,5)})$ is equal to −90 dB).

In some aspects, exclusion thresholds for the MCS may be based, at least in part, on the exclusion thresholds in the matrix $P_{(i,j)}$. For example, a sensing UE 120 that transmits a packet with priority i and MCS index m may exclude resources reserved by a receiving SCI indicating a priority j and an MCS index n if the measured RSRP is higher than a threshold defined as $p_{min(i,x-m),min(j,x-n)}$, where x is a predetermined value based, at least in part, on the size of the matrix $P_{(i,j)}$. For example, in some aspects, x may be equal to 9 in an 8×8 matrix, effectively inverting the priority and MCS values, because a lower priority index may mean that the packet was transmitted at a higher priority (meaning more protection may be needed), while a transmission at a higher MCS value may need more protection than a transmission at a lower MCS. For example, a sensing UE 120 that transmits a packet with priority 5 and MCS index 6 may exclude resources reserved by a receiving SCI indicating priority of 6 and MCS index of 5 if the measured RSRP is higher than the exclusion threshold at the location of $p_{min(5,9-6),min(6,9-5)}$ in the matrix $P_{(i,j)}$, which is equal to the location defined by $p_{min(5,3),min(6,4)}$ (e.g., $p_{(3,4)}$ in the matrix $P_{(i,j)}$.

Alternatively, in some aspects, a sensing UE 120 that transmits a packet with priority i and MCS index m may exclude resources reserved by a receiving SCI indicating a priority j and an MCS index n if the measured RSRP is higher than a threshold defined as $p_{max(1,i-(x-m)),max(1,j-(x-n))}$, where x is a predetermined value based, at least in part, on the size of the matrix $P_{(i,j)}$. For example, in some aspects, x may be equal to 9 in an 8×8 matrix, effectively inverting the priority and MCS values, because a lower priority index may mean that the packet was transmitted at a higher priority (meaning more protection may be needed), while a transmission at a higher MCS value may need more protection than a transmission at a lower MCS. For example, a sensing UE 120 that transmits a packet with priority 5 and MCS index 6 may exclude resources reserved by a receiving SCI indicating a priority of 6 and MCS index of 5 if the measured RSRP is higher than the exclusion threshold at the location of $p_{max(1,5-(9-6)),max(1,6-(9-5))}$ in the matrix $P_{(i,j)}$, which is equal to the location defined by $p_{max(1,2), max(1,2)}$ (e.g., $p_{(2,2)}$ in the matrix $P_{(i,j)}$.

In some aspects, such as when used with frequency range 2 (FR2) bandwidths, each transmission beam may be classified with a beamwidth index k. Each beamwidth index k and MCS pair (e.g., a pair of an MCS and a beamwidth index) may be mapped to an interference tolerance index $I_{(MCS,k)}$. The UE 120 may be configured with a matrix $T_{(m,n)}$ based, at least in part, on the interference tolerance index $I_{(MCS,k)}$, and the approaches discussed above may be applied using the interference tolerance index $I_{(MCS,k)}$ in place of the MCS indices m and n when transmissions or retransmissions of a packet use the same beam level associated with the beamwidth index k.

In some aspects, successive retransmissions may be based, at least in part, on different beam widths or MCSs. When that occurs, the resource selection may be based, at least in part, on the most restrictive resource exclusion threshold. In some aspects, the PHY layer may determine multiple sets of resources for each interference tolerance index $I_{(MCS,k)}$ associated with each of the possible retransmissions and send the multiple sets of resources to the MAC layer. In some aspects, each of the resource sets may be indexed by the retransmission number. The MAC layer may select resources for each transmission or retransmission from a union of the available resources.

Accordingly, packets with higher interference tolerance may be transmitted with a much higher RSRP threshold during the resource selection process. In such aspects, packets that are less tolerant to interference may be transmitted on resources with less interference.

As indicated above, FIG. 7 is provided as an example. Other examples may differ from what is described with respect to FIG. 7.

Figure 8:
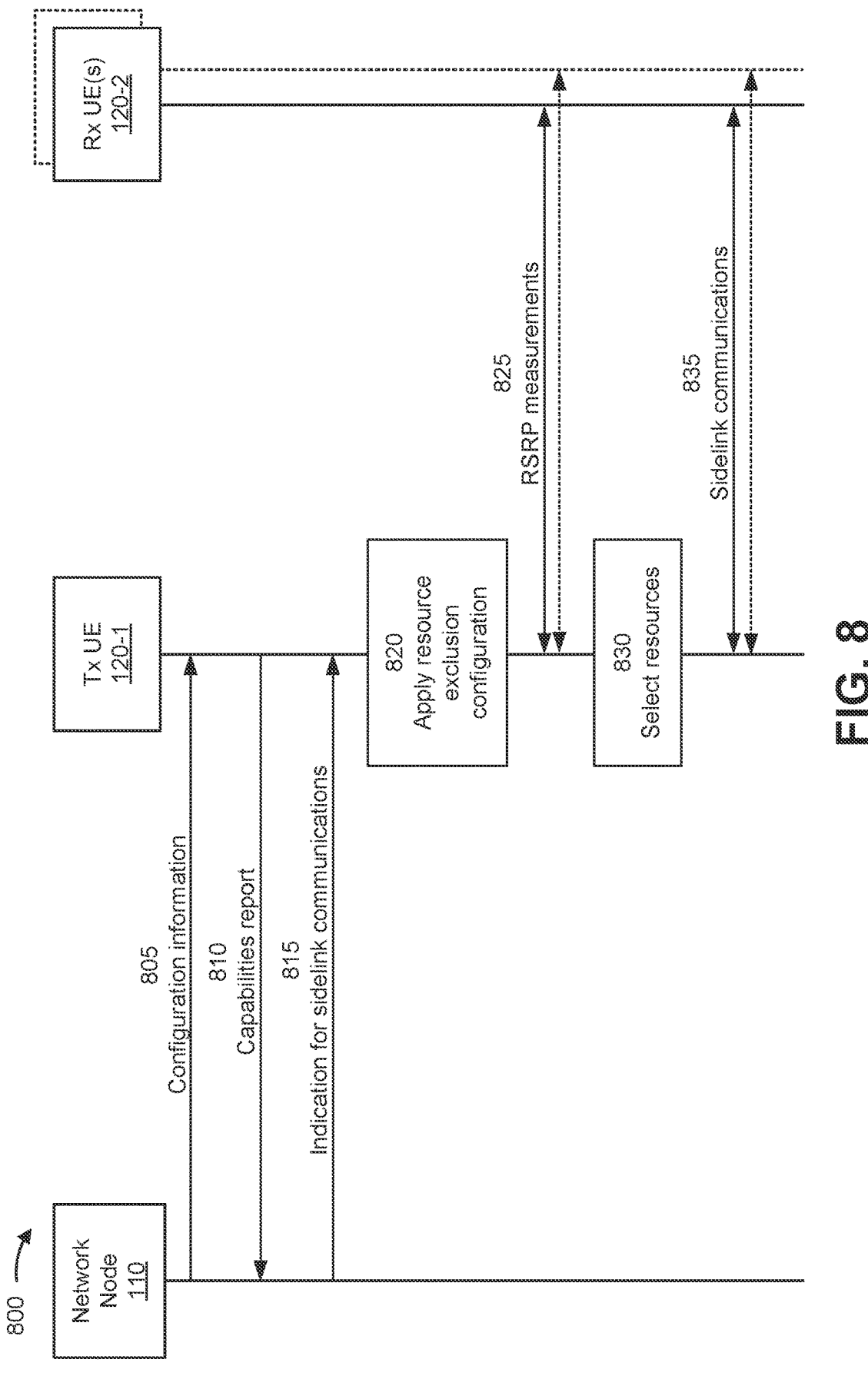
FIG. 8 is a diagram of an example associated with resource exclusion selection for sidelink communications, in accordance with the present disclosure.

FIG. 8 is a diagram of an example 800 associated with resource exclusion selection for sidelink communications, in accordance with the present disclosure. As shown in FIG. 8, a network node (e.g., network node 110, a CU, a DU, and/or an RU) may communicate with a Tx UE 120-1 (e.g., UE 405-1 or Tx/Rx UE 505). In some aspects, the network node 110 and the Tx UE 120-1 may be part of a wireless network (e.g., wireless network 100). The Tx UE 120-1 and the network node may have established a wireless connection prior to operations shown in FIG. 8. The Tx UE 120-1 may engage in sidelink communications with an Rx UE 120-2 (e.g., UE 405-2 or Tx/Rx UE 510). The Rx UE 120-2 and the Tx UE 120-1 may have established a wireless connection prior to operations shown in FIG. 8.

As shown by reference number 805, the network node 110 may transmit, and the Tx UE 120-1 may receive, configuration information. In some aspects, the Tx UE 120-1 may receive the configuration information via one or more of system information (e.g., a master information block (MIB) and/or a system information block (SIB), among other examples), radio resource control (RRC) signaling, one or more medium access control (MAC) control elements (CEs), and/or downlink control information (DCI), among other examples.

In some aspects, the configuration information may indicate one or more candidate configurations and/or communication parameters. In some aspects, the one or more candidate configurations and/or communication parameters may be selected, activated, and/or deactivated by a subsequent indication. For example, the subsequent indication may select a candidate configuration and/or communication parameter from the one or more candidate configurations and/or communication parameters. In some aspects, the subsequent indication (e.g., an indication described herein) may include a dynamic indication, such as one or more MAC CEs and/or one or more DCI messages, among other examples.

In some aspects, the configuration information may include a resource exclusion configuration indicating that the Tx UE 120-1 is to apply at least a first set of resource exclusion thresholds to the selection of sidelink resources to transmit a sidelink communication with the Rx UE 120-2, to transmit sidelink communications in accordance with the resource exclusion configuration, and/or a combination thereof, among other examples. The Tx UE 120-1 may configure itself based at least in part on the configuration information. In some aspects, the Tx UE 120-1 may be configured to perform one or more operations described herein based at least in part on the configuration information.

In some aspects, the resource exclusion configuration may configure the Tx UE 120-1 to select one or more resources for sidelink communications. As discussed above with respect to example 700 of FIG. 7, the resources may be selected based, at least in part, on the priority of the packets transmitted, the packet priority as indicated by the SCI, the packet MCS, the MCS as indicated by the SCI, and/or a combination thereof, among other examples. For example, the resource exclusion configuration may configure the Tx UE 120-1 to select the one or more resources in accordance with a first set of resource exclusion thresholds (e.g., matrix $P_{(i,j)}$), a second set of resource exclusion thresholds (e.g., matrix $T_{(m,n)}$), and/or a combination thereof, among other examples. The matrices $P_{(i,j)}$ and $T_{(m,n)}$ may each relate transmission priority and MCS index to RSRP thresholds that can be used to select one or more resources for sidelink communication with the Rx UE 120-2.

In some aspects, the resource exclusion configuration may include a configuration for determining which resources are available for sidelink transmissions based, at least in part, on RSRP measurements. In some aspects, the resource exclusion configuration may include a configuration for comparing one or more RSRP measurements to the one or more resource exclusion thresholds, from the first set of RSRP thresholds and/or the second set of RSRP thresholds, to determine if a resource should be excluded from sidelink communication.

As shown by reference number 810, the Tx UE 120-1 may transmit, and the network node 110 may receive, a capabilities report. The capabilities report may indicate whether the Tx UE 120-1 supports a feature and/or one or more parameters related to the feature. For example, the capability information may indicate a capability and/or parameter for resource exclusion thresholds for sidelink communications. One or more operations described herein may be based on capability information of the capabilities report. For example, the Tx UE 120-1 may perform a communication in accordance with the capability information, or may receive configuration information that is in accordance with the capability information. In some aspects, the capabilities report may indicate Tx UE 120-1 support for resource exclusion thresholds for sidelink communications with the Rx UE 120-2.

In some aspects, the configuration information described in connection with reference number 805 and/or the capabilities report may include information transmitted via multiple communications. Additionally, or alternatively, the network node 110 may transmit the configuration information, or a communication including at least a portion of the configuration information, before and/or after the Tx UE 120-1 transmits the capabilities report. For example, the network node 110 may transmit a first portion of the configuration information before the capabilities report, the Tx UE 120-1 may transmit at least a portion of the capabilities report, and the network node 110 may transmit a second portion of the configuration information after receiving the capabilities report.

As shown by reference number 815, the UE may receive, and the network node may transmit, an indication for sidelink communications. The indication for sidelink communications may indicate the Tx UE 120-1 to communicate, via sidelink, with the Rx UE 120-2 in accordance with the resource exclusion configuration.

As shown by reference number 820, the Tx UE 120-1 may configure itself, based at least in part on receiving the indication described in connection with reference number 815 to apply the resource exclusion configuration.

As shown by reference number 825, the Tx UE 120-1 may communicate with the Rx UE 120-1 and another UE (also referred to as the "other UE", below, and shown in FIG. 8 in dotted lines) to determine RSRP measurements for one or more sidelink communication channels between the Tx UE 120-1 and the Rx UE 120-2. The Tx UE 120-1 may receive the SCI from the other UE to get the MCS, the priority (indicated in SCI, for example), and/or a combination thereof, among other examples. The Tx UE 120-1 may use the MCS and priority indicated by SCI to determine the RSRP threshold based on the MCS, priority of transmissions by the Tx UE 120-1, and/or a combination thereof, among other examples. The Tx UE 120-1 may use the RSRP threshold to select resources for communication with one or more other Rx UEs 120-2.

As shown by reference number 830, the Tx UE 120-1 may select resources in accordance with the resource exclusion configuration. As discussed above with respect to FIG. 7, the resources may be selected based, at least in part, on packet priority, priority indicated by SCI, the MCS of the packet, the MCS indicated by the SCI, and/or a combination thereof, among other examples.

As shown by reference number 835, the Tx UE 120-1 and the Rx UE 120-2 may engage in sidelink communications in accordance with the resource exclusion threshold and the RSRP measurements. For example, the Tx UE 120-1 may compare the RSRP measurements to the selected resource exclusion threshold.

As indicated above, FIG. 8 is provided as an example. Other examples may differ from what is described with respect to FIG. 8.

FIG. 9 is a diagram illustrating an example process 900 performed, for example, at a UE or an apparatus of a UE, in accordance with the present disclosure. Example process 900 is an example where the apparatus or the UE (e.g., UE 120) performs operations associated with techniques for adaptive resource exclusion thresholds.

As shown in FIG. 9, in some aspects, process 900 may include receiving a resource exclusion configuration for applying at least a first set of resource exclusion thresholds to a selection of sidelink resources for transmitting a sidelink communication, the first set of resource exclusion thresholds being based, at least in part, on one or more MCSs or an MCS index (block 910). For example, the UE (e.g., using reception component 1102 and/or communication manager 1106, depicted in FIG. 11) may receive a resource exclusion configuration for applying at least a first set of resource exclusion thresholds to a selection of sidelink resources for transmitting a sidelink communication, the first set of resource exclusion thresholds being based, at least in part, on one or more MCSs or an MCS index, as described above.

As further shown in FIG. 9, in some aspects, process 900 may include transmitting the sidelink communication in accordance with the resource exclusion configuration (block 920). For example, the UE (e.g., using transmission component 1104 and/or communication manager 1106, depicted in FIG. 11) may transmit the sidelink communication in accordance with the resource exclusion configuration, as described above.

Process 900 may include additional aspects, such as any single aspect or any combination of aspects described below and/or in connection with one or more other processes described elsewhere herein.

In a first aspect, the resource exclusion configuration includes a configuration for selecting one or more resources for the sidelink communication in accordance with the resource exclusion configuration.

In a second aspect, alone or in combination with the first aspect, selecting the one or more resources includes selecting the one or more resources based, at least in part, on the one or more MCSs or the MCS index.

In a fourth aspect, alone or in combination with one or more of the first through third aspects, selecting the one or more resources includes selecting the one or more resources based, at least in part, on the one or more MCSs or the MCS index and a packet priority.

In a fifth aspect, alone or in combination with one or more of the first through fourth aspects, selecting the one or more resources includes selecting the one or more resources based, at least in part, on a resource exclusion threshold in the first set of resource exclusion thresholds.

In a sixth aspect, alone or in combination with one or more of the first through fifth aspects, the resource exclusion configuration includes a configuration for applying the first set of resource exclusion thresholds and a second set of resource exclusion thresholds to the sidelink communication, the second set of resource exclusion thresholds being based, at least in part, on a packet priority.

In a seventh aspect, alone or in combination with one or more of the first through sixth aspects, selecting the one or more resources includes selecting the one or more resources based, at least in part, on a resource exclusion threshold included in one of the first set of resource exclusion thresholds or the second set of resource exclusion thresholds.

In an eighth aspect, alone or in combination with one or more of the first through seventh aspects, selecting the one or more resources includes selecting the one or more resources according to a resource exclusion threshold having a greatest value among the first set of resource exclusion thresholds or the second set of resource exclusion thresholds for the one or more MCSs or the MCS index and the packet priority.

In a ninth aspect, alone or in combination with one or more of the first through eighth aspects, selecting the one or more resources includes selecting the one or more resources based, at least in part, on comparing an RSRP measurement to one or more resource exclusion thresholds of the first set of resource exclusion thresholds or the second set of resource exclusion thresholds.

In a tenth aspect, alone or in combination with one or more of the first through ninth aspects, the resource exclusion configuration includes a configuration for comparing the RSRP measurement to one or more resource exclusion thresholds in the first set of resource exclusion thresholds.

In an eleventh aspect, alone or in combination with one or more of the first through tenth aspects, the resource exclusion configuration includes a configuration for comparing the RSRP measurement to one or more resource exclusion thresholds in the second set of resource exclusion thresholds.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

FIG. 10 is a diagram illustrating an example process 1000 performed, for example, at a network node or an apparatus of a network node, in accordance with the present disclosure. Example process 1000 is an example where the apparatus or the network node (e.g., network node 110) performs operations associated with techniques for adaptive resource exclusion thresholds.

As shown in FIG. 10, in some aspects, process 1000 may include configuring a UE with a resource exclusion configuration for applying at least a first set of resource exclusion thresholds to a selection of sidelink resources for transmitting a sidelink communication, the first set of resource exclusion thresholds being based, at least in part, on one or more MCSs or an MCS index (block 1010). For example, the network node (e.g., using communication manager 1206, depicted in FIG. 12) may configure a UE with a resource exclusion configuration for applying at least a first set of resource exclusion thresholds to a selection of sidelink resources for transmitting a sidelink communication, the first set of resource exclusion thresholds being based, at least in part, on one or more MCSs or an MCS index, as described above.

As further shown in FIG. 10, in some aspects, process 1000 may include configuring the UE to transmit the sidelink communication in accordance with the resource exclusion configuration (block 1020). For example, the network node (e.g., using communication manager 1206, depicted in FIG. 12) may configure the UE to transmit the sidelink communication in accordance with the resource exclusion configuration, as described above.

Process 1000 may include additional aspects, such as any single aspect or any combination of aspects described below and/or in connection with one or more other processes described elsewhere herein.

In a first aspect, configuring the UE with the resource exclusion configuration includes configuring the UE to select one or more resources for the sidelink communication in accordance with the resource exclusion configuration.

In a second aspect, alone or in combination with the first aspect, configuring the UE to select the one or more resources includes configuring the UE to select the one or more resources based, at least in part, on the one or more MCSs or the MCS index.

In a third aspect, alone or in combination with one or more of the first and second aspects, configuring the UE to select the one or more resources includes configuring the UE to select the one or more resources based, at least in part, on the one or more MCSs or the MCS index and a packet priority.

In a fourth aspect, alone or in combination with one or more of the first through third aspects, configuring the UE to select the one or more resources includes configuring the UE to select the one or more resources based, at least in part, on a resource exclusion threshold in the first set of resource exclusion thresholds.

In a fifth aspect, alone or in combination with one or more of the first through fourth aspects, the resource exclusion configuration includes a configuration for applying the first set of resource exclusion thresholds and a second set of resource exclusion thresholds to the sidelink communication, the second set of resource exclusion thresholds being based, at least in part, on a packet priority.

In a sixth aspect, alone or in combination with one or more of the first through fifth aspects, configuring the UE to select the one or more resources includes configuring the UE to select the one or more resources based, at least in part, on a resource exclusion threshold included in one of the first set of resource exclusion thresholds or the second set of resource exclusion thresholds.

In a seventh aspect, alone or in combination with one or more of the first through sixth aspects, configuring the UE to select the one or more resources includes configuring the UE to select the one or more resources according to a resource exclusion threshold having a greatest value among the first set of resource exclusion thresholds or the second set of resource exclusion thresholds for the one or more MCSs or the MCS index and the packet priority.

In an eighth aspect, alone or in combination with one or more of the first through seventh aspects, configuring the UE to select the one or more resources includes configuring the UE to select the one or more resources based, at least in part, on comparing an RSRP measurement to one or more resource exclusion thresholds of the first set of resource exclusion thresholds or the second set of resource exclusion thresholds.

In a ninth aspect, alone or in combination with one or more of the first through eighth aspects, configuring the UE with the resource exclusion configuration includes configuring the UE to compare the RSRP measurement to one or more resource exclusion thresholds in the first set of resource exclusion thresholds.

In a tenth aspect, alone or in combination with one or more of the first through ninth aspects, configuring the UE with the resource exclusion configuration includes configuring the UE to compare the RSRP measurement to one or more resource exclusion thresholds in the second set of resource exclusion thresholds.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
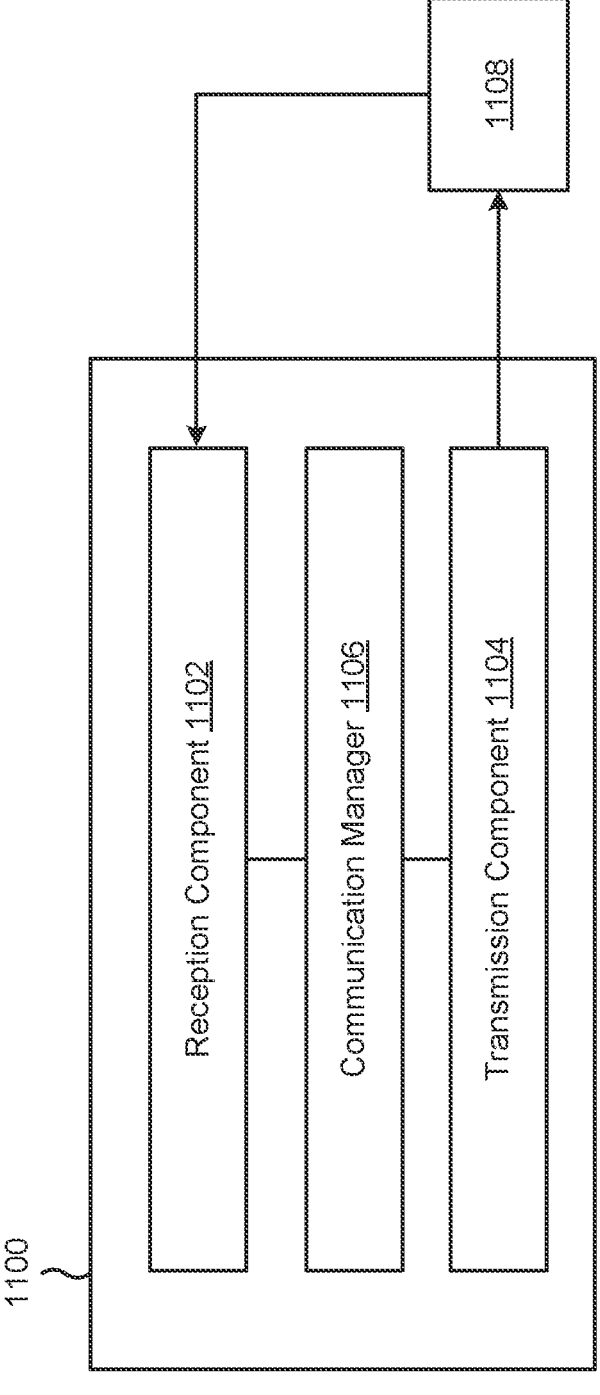
FIG. 11 is a diagram of an example apparatus for wireless communication, in accordance with the present disclosure.

FIG. 11 is a diagram of an example apparatus 1100 for wireless communication, in accordance with the present disclosure. The apparatus 1100 may be a UE, or a UE may include the apparatus 1100. In some aspects, the apparatus 1100 includes a reception component 1102, a transmission component 1104, and/or a communication manager 1106, which may be in communication with one another (for example, via one or more buses and/or one or more other components). In some aspects, the communication manager 1106 is the communication manager 140 described in connection with FIG. 1. As shown, the apparatus 1100 may communicate with another apparatus 1108, such as a UE or a network node (such as a CU, a DU, an RU, or a base station), using the reception component 1102 and the transmission component 1104.

In some aspects, the apparatus 1100 may be configured to perform one or more operations described herein in connection with FIGS. 4-8. Additionally, or alternatively, the apparatus 1100 may be configured to perform one or more processes described herein, such as process 900 of FIG. 9. In some aspects, the apparatus 1100 and/or one or more components shown in FIG. 11 may include one or more components of the UE described in connection with FIG. 2. Additionally, or alternatively, one or more components shown in FIG. 11 may be implemented within one or more components described in connection with FIG. 2. Additionally, or alternatively, one or more components of the set of components may be implemented at least in part as software stored in one or more memories. For example, a component (or a portion of a component) may be implemented as instructions or code stored in a non-transitory computer-readable medium and executable by one or more controllers or one or more processors to perform the functions or operations of the component.

The reception component 1102 may receive communications, such as reference signals, control information, data communications, or a combination thereof, from the apparatus 1108. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1100. In some aspects, the reception component 1102 may include one or more antennas, one or more modems, one or more demodulators, one or more MIMO detectors, one or more receive processors, one or more controllers/processors, one or more memories, or a combination thereof, of the UE described in connection with FIG. 2.

The transmission component 1104 may transmit communications, such as reference signals, control information, data communications, or a combination thereof, to the apparatus 1108. In some aspects, one or more other components of the apparatus 1100 may generate communications and may provide the generated communications to the transmission component 1104 for transmission to the apparatus 1108. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1108. In some aspects, the transmission component 1104 may include one or more antennas, one or more modems, one or more modulators, one or more transmit MIMO processors, one or more transmit processors, one or more controllers/processors, one or more memories, or a combination thereof, of the UE described in connection with FIG. 2. In some aspects, the transmission component 1104 may be co-located with the reception component 1102 in one or more transceivers.

The communication manager 1106 may support operations of the reception component 1102 and/or the transmission component 1104. For example, the communication manager 1106 may receive information associated with configuring reception of communications by the reception component 1102 and/or transmission of communications by the transmission component 1104. Additionally, or alternatively, the communication manager 1106 may generate and/or provide control information to the reception component 1102 and/or the transmission component 1104 to control reception and/or transmission of communications.

The reception component 1102 may receive a resource exclusion configuration for applying at least a first set of resource exclusion thresholds to a selection of sidelink resources for transmitting a sidelink communication, the first set of resource exclusion thresholds being based, at least in part, on one or more MCSs or an MCS index. The transmission component 1104 may transmit the sidelink communication in accordance with the resource exclusion configuration.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

Figure 12:
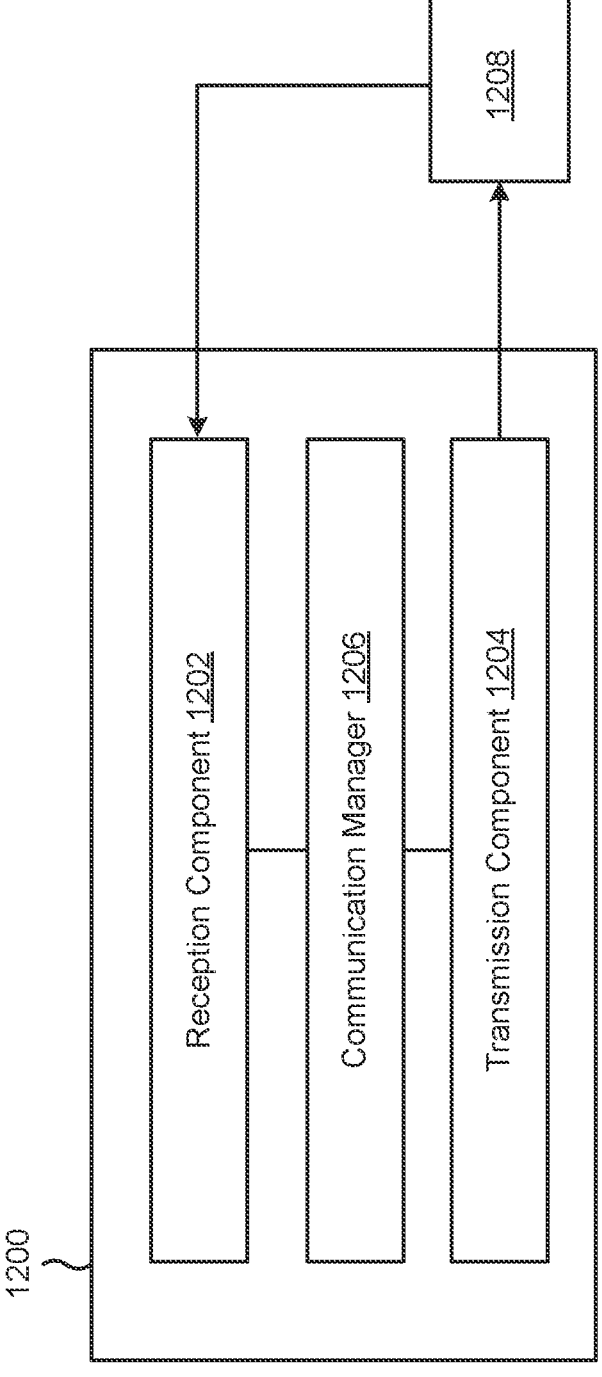
FIG. 12 is a diagram of an example apparatus for wireless communication, in accordance with the present disclosure.

FIG. 12 is a diagram of an example apparatus 1200 for wireless communication, in accordance with the present disclosure. The apparatus 1200 may be a network node, or a network node may include the apparatus 1200. In some aspects, the apparatus 1200 includes a reception component 1202, a transmission component 1204, and/or a communication manager 1206, which may be in communication with one another (for example, via one or more buses and/or one or more other components). In some aspects, the communication manager 1206 is the communication manager 150 described in connection with FIG. 1. As shown, the apparatus 1200 may communicate with another apparatus 1208, such as a UE or a network node (such as a CU, a DU, an RU, or a base station), using the reception component 1202 and the transmission component 1204.

In some aspects, the apparatus 1200 may be configured to perform one or more operations described herein in connection with FIGS. 4-8. Additionally, or alternatively, the apparatus 1200 may be configured to perform one or more processes described herein, such as process 1000 of FIG. 10. In some aspects, the apparatus 1200 and/or one or more components shown in FIG. 12 may include one or more components of the network node described in connection with FIG. 2. Additionally, or alternatively, one or more components shown in FIG. 12 may be implemented within one or more components described in connection with FIG. 2. Additionally, or alternatively, one or more components of the set of components may be implemented at least in part as software stored in one or more memories. For example, a component (or a portion of a component) may be implemented as instructions or code stored in a non-transitory computer-readable medium and executable by one or more controllers or one or more processors to perform the functions or operations of the component.

The reception component 1202 may receive communications, such as reference signals, control information, data communications, or a combination thereof, from the apparatus 1208. The reception component 1202 may provide received communications to one or more other components of the apparatus 1200. In some aspects, the reception component 1202 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1200. In some aspects, the reception component 1202 may include one or more antennas, one or more modems, one or more demodulators, one or more MIMO detectors, one or more receive processors, one or more controllers/processors, one or more memories, or a combination thereof, of the network node described in connection with FIG. 2. In some aspects, the reception component 1202 and/or the transmission component 1204 may include or may be included in a network interface. The network interface may be configured to obtain and/or output signals for the apparatus 1200 via one or more communications links, such as a backhaul link, a midhaul link, and/or a fronthaul link.

The transmission component 1204 may transmit communications, such as reference signals, control information, data communications, or a combination thereof, to the apparatus 1208. In some aspects, one or more other components of the apparatus 1200 may generate communications and may provide the generated communications to the transmission component 1204 for transmission to the apparatus 1208. In some aspects, the transmission component 1204 may perform signal processing on the generated communications (such as filtering, amplification, modulation, digital-to-analog conversion, multiplexing, interleaving, mapping, or encoding, among other examples), and may transmit the processed signals to the apparatus 1208. In some aspects, the transmission component 1204 may include one or more antennas, one or more modems, one or more modulators, one or more transmit MIMO processors, one or more transmit processors, one or more controllers/processors, one or more memories, or a combination thereof, of the network node described in connection with FIG. 2. In some aspects, the transmission component 1204 may be co-located with the reception component 1202 in one or more transceivers.

The communication manager 1206 may support operations of the reception component 1202 and/or the transmission component 1204. For example, the communication manager 1206 may receive information associated with configuring reception of communications by the reception component 1202 and/or transmission of communications by the transmission component 1204. Additionally, or alternatively, the communication manager 1206 may generate and/or provide control information to the reception component 1202 and/or the transmission component 1204 to control reception and/or transmission of communications.

The communication manager 1206 may configure a UE with a resource exclusion configuration for applying at least a first set of resource exclusion thresholds to a selection of sidelink resources for transmitting a sidelink communication, the first set of resource exclusion thresholds being based, at least in part, on one or more MCSs or an MCS index. The communication manager 1206 may configure the UE to transmit the sidelink communication in accordance with the resource exclusion configuration.

The number and arrangement of components shown in FIG. 12 are provided as an example. In practice, there may be additional components, fewer components, different components, or differently arranged components than those shown in FIG. 12. Furthermore, two or more components shown in FIG. 12 may be implemented within a single component, or a single component shown in FIG. 12 may be implemented as multiple, distributed components. Additionally, or alternatively, a set of (one or more) components shown in FIG. 12 may perform one or more functions described as being performed by another set of components shown in FIG. 12.

The following provides an overview of some Aspects of the present disclosure:

Aspect 1: A method of wireless communication performed by a UE, comprising: receiving a resource exclusion configuration for applying at least a first set of resource exclusion thresholds to a selection of sidelink resources for transmitting a sidelink communication, the first set of resource exclusion thresholds being based, at least in part, on one or more MCSs or an MCS index; and transmitting the sidelink communication in accordance with the resource exclusion configuration.

Aspect 2: The method of Aspect 1, wherein the resource exclusion configuration includes a configuration for selecting one or more resources for the sidelink communication in accordance with the resource exclusion configuration.

Aspect 3: The method of Aspect 2, wherein selecting the one or more resources includes selecting the one or more resources based, at least in part, on the one or more MCSs or the MCS index.

Aspect 4: The method of Aspect 2, wherein selecting the one or more resources includes selecting the one or more resources based, at least in part, on the one or more MCSs or the MCS index and a packet priority.

Aspect 5: The method of Aspect 2, wherein selecting the one or more resources includes selecting the one or more resources based, at least in part, on a resource exclusion threshold in the first set of resource exclusion thresholds.

Aspect 6: The method of Aspect 2, wherein the resource exclusion configuration includes a configuration for applying the first set of resource exclusion thresholds and a second set of resource exclusion thresholds to the sidelink communication, the second set of resource exclusion thresholds being based, at least in part, on a packet priority.

Aspect 7: The method of Aspect 6, wherein selecting the one or more resources includes selecting the one or more resources based, at least in part, on a resource exclusion threshold included in one of the first set of resource exclusion thresholds or the second set of resource exclusion thresholds.

Aspect 8: The method of Aspect 7, wherein selecting the one or more resources includes selecting the one or more resources according to a resource exclusion threshold having a greatest value among the first set of resource exclusion thresholds or the second set of resource exclusion thresholds for the one or more MCSs or the MCS index and the packet priority.

Aspect 9: The method of Aspect 8, wherein selecting the one or more resources includes selecting the one or more resources based, at least in part, on comparing an RSRP measurement to one or more resource exclusion thresholds of the first set of resource exclusion thresholds or the second set of resource exclusion thresholds.

Aspect 10: The method of Aspect 9, wherein the resource exclusion configuration includes a configuration for comparing the RSRP measurement to one or more resource exclusion thresholds in the first set of resource exclusion thresholds.

Aspect 11: The method of Aspect 9, wherein the resource exclusion configuration includes a configuration for comparing the RSRP measurement to one or more resource exclusion thresholds in the second set of resource exclusion thresholds.

Aspect 12: The method of any of Aspects 1-9, wherein the sidelink communication is associated with a beamwidth index and wherein an MCS and beamwidth index pair is mapped to an interference tolerance index, and the first set of resource exclusion thresholds is based, at least in part, on the interference tolerance index.

Aspect 13: A method of wireless communication performed by a network node, comprising: configuring a UE with a resource exclusion configuration for applying at least a first set of resource exclusion thresholds to a selection of sidelink resources for transmitting a sidelink communication, the first set of resource exclusion thresholds being based, at least in part, on one or more MCSs or an MCS index; and configuring the UE to transmit the sidelink communication in accordance with the resource exclusion configuration.

Aspect 14: The method of Aspect 13, wherein configuring the UE with the resource exclusion configuration includes configuring the UE to select one or more resources for the sidelink communication in accordance with the resource exclusion configuration.

Aspect 15: The method of Aspect 14, wherein configuring the UE to select the one or more resources includes configuring the UE to select the one or more resources based, at least in part, on the one or more MCSs or the MCS index.

Aspect 16: The method of Aspect 14, wherein configuring the UE to select the one or more resources includes configuring the UE to select the one or more resources based, at least in part, on the one or more MCSs or the MCS index and a packet priority.

Aspect 17: The method of Aspect 14, wherein configuring the UE to select the one or more resources includes configuring the UE to select the one or more resources based, at least in part, on a resource exclusion threshold in the first set of resource exclusion thresholds.

Aspect 18: The method of Aspect 14, wherein the resource exclusion configuration includes a configuration for applying the first set of resource exclusion thresholds and a second set of resource exclusion thresholds to the sidelink communication, the second set of resource exclusion thresholds being based, at least in part, on a packet priority.

Aspect 19: The method of Aspect 18, wherein configuring the UE to select the one or more resources includes configuring the UE to select the one or more resources based, at least in part, on a resource exclusion threshold included in one of the first set of resource exclusion thresholds or the second set of resource exclusion thresholds.

Aspect 20: The method of Aspect 19, wherein configuring the UE to select the one or more resources includes configuring the UE to select the one or more resources according to a resource exclusion threshold having a greatest value among the first set of resource exclusion thresholds or the second set of resource exclusion thresholds for the one or more MCSs or the MCS index and the packet priority.

Aspect 21: The method of Aspect 18, wherein configuring the UE to select the one or more resources includes configuring the UE to select the one or more resources based, at least in part, on comparing an RSRP measurement to one or more resource exclusion thresholds of the first set of resource exclusion thresholds or the second set of resource exclusion thresholds.

Aspect 22: The method of Aspect 21, wherein configuring the UE with the resource exclusion configuration includes configuring the UE to compare the RSRP measurement to one or more resource exclusion thresholds in the first set of resource exclusion thresholds.

Aspect 23: The method of Aspect 21, wherein configuring the UE with the resource exclusion configuration includes configuring the UE to compare the RSRP measurement to one or more resource exclusion thresholds in the second set of resource exclusion thresholds.

Aspect 24: The method of any of Aspects 13-21, wherein the sidelink communication is associated with a beamwidth index and wherein a pair of an MCS and the beamwidth index is mapped to an interference tolerance index.

Aspect 25: The method of Aspect 24, wherein the first set of resource exclusion thresholds is based, at least in part, on the interference tolerance index.

Aspect 26: An apparatus for wireless communication at a device, the apparatus comprising one or more processors;

one or more memories coupled with the one or more processors; and instructions stored in the one or more memories and executable by the one or more processors to cause the apparatus to perform the method of one or more of Aspects 1-25.

Aspect 27: An apparatus for wireless communication at a device, the apparatus comprising one or more memories and one or more processors coupled to the one or more memories, the one or more processors configured to cause the device to perform the method of one or more of Aspects 1-25.

Aspect 28: An apparatus for wireless communication, the apparatus comprising at least one means for performing the method of one or more of Aspects 1-25.

Aspect 29: A non-transitory computer-readable medium storing code for wireless communication, the code comprising instructions executable by one or more processors to perform the method of one or more of Aspects 1-25.

Aspect 30: A non-transitory computer-readable medium storing a set of instructions for wireless communication, the set of instructions comprising one or more instructions that, when executed by one or more processors of a device, cause the device to perform the method of one or more of Aspects 1-25.

Aspect 31: A device for wireless communication, the device comprising a processing system that includes one or more processors and one or more memories coupled with the one or more processors, the processing system configured to cause the device to perform the method of one or more of Aspects 1-25.

Aspect 32: An apparatus for wireless communication at a device, the apparatus comprising one or more memories and one or more processors coupled to the one or more memories, the one or more processors individually or collectively configured to cause the device to perform the method of one or more of Aspects 1-25.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware, firmware, or a combination of hardware and software. As used herein, a processor is implemented in hardware, firmware, or a combination of hardware and software. As used herein, the phrase "based on" is intended to be broadly construed to mean "based at least in part on." As used herein, "satisfying a threshold" may, depending on the context, refer to a value being greater than the threshold, greater than or equal to the threshold, less than the threshold, less than or equal to the threshold, equal to the threshold, or not equal to the threshold, among other examples. As used herein, a phrase referring to "at least one of" a list of items refers to any combination of those items, including single members. As an example, "at least one of: a, b, or c" is intended to cover: a, b, c, a+b, a+c, b+c, and a+b+c.

Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (for example, related items, unrelated items, or a combination of related and unrelated items), and may be used interchangeably with "one or more." Where only one item is intended, the phrase "only one" or similar language is used. Also, as used herein, the terms "has," "have," "having," and similar terms are intended to be open-ended terms that do not limit an element that they modify (for example, an element "having" A also may have B). Further, as used herein, the term "or" is intended to be inclusive when used in a series and may be used interchangeably with "and/or," unless explicitly stated otherwise (for example, if used in combination with "either" or "only one of").

The various illustrative logics, logical blocks, modules, circuits and algorithm processes described in connection with the aspects disclosed herein may be implemented as electronic hardware, computer software, or combinations of both. The interchangeability of hardware and software has been described generally, in terms of functionality, and illustrated in the various illustrative components, blocks, modules, circuits and processes described herein. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or any conventional processor, controller, microcontroller, or state machine. A processor also may be implemented as a combination of computing devices, for example, a combination of a DSP and a microprocessor, a plurality of microprocessors, one or more microprocessors in conjunction with a DSP core, or any other such configuration. In some aspects, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Aspects of the subject matter described in this specification also can be implemented as one or more computer programs (such as one or more modules of computer program instructions) encoded on a computer storage media for execution by, or to control the operation of, a data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the media described herein should also be included within the scope of computer-readable media. Additionally, the operations of a method or algorithm may reside as one or any combination or set of codes and instructions on a machine readable medium and computer-readable medium, which may be incorporated into a computer program product.

Various modifications to the aspects described in this disclosure may be readily apparent to those skilled in the art, and the generic principles defined herein may be applied to other aspects without departing from the spirit or scope of this disclosure. Thus, the claims are not intended to be limited to the aspects shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate aspects also can be implemented in combination in a single aspect. Conversely, various features that are described in the context of a single aspect also can be implemented in multiple aspects separately or in any suitable subcombination. Moreover, although features may be described as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the aspects described should not be understood as requiring such separation in all aspects, and it should be understood that the described program components and systems can generally be integrated together in a single software product or packaged into multiple software products. Additionally, other aspects are within the scope of the following claims. In some cases, the actions recited in the claims can be performed in a different order and still achieve desirable results.

What is claimed is:

1. A user equipment (UE) for wireless communication, comprising:

one or more memories; and one or more processors, coupled to the one or more memories, configured to cause the UE to:

receive a resource exclusion configuration for applying at least a first set of resource exclusion thresholds to a selection of sidelink resources for transmitting a sidelink communication, the first set of resource exclusion thresholds being based, at least in part, on one or more modulation and coding schemes (MCSs) or an MCS index, wherein the sidelink communication is associated with a beamwidth index, and wherein a pair of an MCS and the beamwidth index is mapped to an interference tolerance index, wherein the first set of resource exclusion thresholds is based, at least in part, on the interference tolerance index; and transmit the sidelink communication in accordance with the resource exclusion configuration.

2. The UE of claim 1, wherein the resource exclusion configuration includes a configuration for selecting one or more resources for the sidelink communication in accordance with the resource exclusion configuration.

3. The UE of claim 2, wherein the one or more processors, to cause the UE to select the one or more resources, are configured to cause the UE to select the one or more resources based, at least in part, on the one or more MCSs or the MCS index.

4. The UE of claim 2, wherein the one or more processors, to cause the UE to select the one or more resources, are configured to cause the UE to select the one or more resources based, at least in part, on the one or more MCSs or the MCS index and a packet priority.

5. The UE of claim 2, wherein the one or more processors, to cause the UE to select the one or more resources, are configured to cause the UE to select the one or more resources based, at least in part, on a resource exclusion threshold in the first set of resource exclusion thresholds.

6. The UE of claim 2, wherein the resource exclusion configuration includes a configuration for applying the first set of resource exclusion thresholds and a second set of resource exclusion thresholds to the sidelink communication, the second set of resource exclusion thresholds being based, at least in part, on a packet priority.

7. The UE of claim 6, wherein the one or more processors, to cause the UE to select the one or more resources, are configured to cause the UE to select the one or more resources based, at least in part, on a resource exclusion threshold included in one of the first set of resource exclusion thresholds or the second set of resource exclusion thresholds.

8. The UE of claim 7, wherein the one or more processors, to cause the UE to select the one or more resources, are configured to cause the UE to select the one or more resources according to a resource exclusion threshold having a greatest value among the first set of resource exclusion thresholds or the second set of resource exclusion thresholds for the one or more MCSs or the MCS index and the packet priority.

9. The UE of claim 6, wherein the one or more processors, to cause the UE to select the one or more resources, are configured to cause the UE to select the one or more resources based, at least in part, on comparing a reference signal received power (RSRP) measurement to one or more resource exclusion thresholds of the first set of resource exclusion thresholds or the second set of resource exclusion thresholds.

10. The UE of claim 9, wherein the resource exclusion configuration includes a configuration for comparing the RSRP measurement to one or more resource exclusion thresholds in the first set of resource exclusion thresholds.

11. The UE of claim 9, wherein the resource exclusion configuration includes a configuration for comparing the RSRP measurement to one or more resource exclusion thresholds in the second set of resource exclusion thresholds.

12. A network node for wireless communication, comprising:

one or more memories; and one or more processors, coupled to the one or more memories, configured to cause the network node to:

configure a user equipment (UE) with a resource exclusion configuration for applying at least a first set of resource exclusion thresholds to a selection of sidelink resources for transmitting a sidelink communication, the first set of resource exclusion thresholds being based, at least in part, on one or more modulation and coding schemes (MCSs) or an MCS index, wherein the sidelink communication is associated with a beamwidth index, and wherein a pair of an MCS and the beamwidth index is mapped to an interference tolerance index, wherein the first set of resource exclusion thresholds is based, at least in part, on the interference tolerance index; and configure the UE to transmit the sidelink communication in accordance with the resource exclusion configuration.

13. The network node of claim 12, wherein the one or more processors, to cause the network node to configure the UE with the resource exclusion configuration, are configured to cause the network node to configure the UE to select one or more resources for the sidelink communication in accordance with the resource exclusion configuration.

14. The network node of claim 13, wherein the one or more processors, to cause the network node to configure the UE to select the one or more resources, are configured to cause the network node to configure the UE to select the one or more resources based, at least in part, on the one or more MCSs or the MCS index.

15. The network node of claim 13, wherein the one or more processors, to cause the network node to configure the UE to select the one or more resources, are configured to cause the network node to configure the UE to select the one or more resources based, at least in part, on the one or more MCSs or the MCS index and a packet priority.

16. The network node of claim 13, wherein the one or more processors, to cause the network node to configure the UE to select the one or more resources, are configured to cause the network node to configure the UE to select the one or more resources based, at least in part, on a resource exclusion threshold in the first set of resource exclusion thresholds.

17. The network node of claim 13, wherein the resource exclusion configuration includes a configuration for applying the first set of resource exclusion thresholds and a second set of resource exclusion thresholds to the sidelink communication, the second set of resource exclusion thresholds being based, at least in part, on a packet priority.

18. The network node of claim 17, wherein the one or more processors, to cause the network node to configure the UE to select the one or more resources, are configured to cause the network node to configure the UE to select the one or more resources based, at least in part, on a resource exclusion threshold included in one of the first set of resource exclusion thresholds or the second set of resource exclusion thresholds.

19. The network node of claim 18, wherein the one or more processors, to cause the network node to configure the UE to select the one or more resources, are configured to cause the network node to configure the UE to select the one or more resources according to a resource exclusion threshold having a greatest value among the first set of resource exclusion thresholds or the second set of resource exclusion thresholds for the one or more MCSs or the MCS index and the packet priority.

20. The network node of claim 17, wherein the one or more processors, to cause the network node to configure the UE to select the one or more resources, are configured to cause the network node to configure the UE to select the one or more resources based, at least in part, on comparing a reference signal received power (RSRP) measurement to one or more resource exclusion thresholds of the first set of resource exclusion thresholds or the second set of resource exclusion thresholds.

21. The network node of claim 20, wherein the one or more processors, to cause the network node to configure the UE with the resource exclusion configuration, are configured to cause the network node to configure the UE to compare the RSRP measurement to one or more resource exclusion thresholds in the first set of resource exclusion thresholds.

22. The network node of claim 20, wherein the one or more processors, to cause the network node to configure the UE with the resource exclusion configuration, are configured to cause the network node to configure the UE to compare the RSRP measurement to one or more resource exclusion thresholds in the second set of resource exclusion thresholds.

23. A method of wireless communication performed by a user equipment (UE), comprising:

receiving a resource exclusion configuration for applying at least a first set of resource exclusion thresholds to a selection of sidelink resources for transmitting a sidelink communication, the first set of resource exclusion thresholds being based, at least in part, on one or more modulation and coding schemes (MCSs) or an MCS index, wherein the sidelink communication is associated with a beamwidth index, and wherein a pair of an MCS and the beamwidth index is mapped to an interference tolerance index, wherein the first set of resource exclusion thresholds is based, at least in part, on the interference tolerance index; and transmitting the sidelink communication in accordance with the resource exclusion configuration.

24. The method of claim 23, wherein the resource exclusion configuration includes a configuration for selecting one or more resources for the sidelink communication in accordance with the resource exclusion configuration.

25. The method of claim 24, wherein the resource exclusion configuration includes a configuration for applying the first set of resource exclusion thresholds and a second set of resource exclusion thresholds to the sidelink communication, the second set of resource exclusion thresholds being based, at least in part, on a packet priority.

26. A method of wireless communication performed by a network node, comprising:

configuring a user equipment (UE) with a resource exclusion configuration for applying at least a first set of resource exclusion thresholds to a selection of sidelink resources for transmitting a sidelink communication, the first set of resource exclusion thresholds being based, at least in part, on one or more modulation and coding schemes (MCSs) or an MCS index, wherein the sidelink communication is associated with a beamwidth index, and wherein a pair of an MCS and the beamwidth index is mapped to an interference tolerance index, wherein the first set of resource exclusion thresholds is based, at least in part, on the interference tolerance index; and configuring the UE to transmit the sidelink communication in accordance with the resource exclusion configuration. 5

27. The method of claim 26, wherein the resource exclusion configuration includes a configuration for applying the first set of resource exclusion thresholds and a second set of resource exclusion thresholds to the sidelink communication, the second set of resource exclusion thresholds being 10 based, at least in part, on a packet priority.

28. The method of claim 27, further comprising configuring the UE to select one or more resources based, at least in part, on a resource exclusion threshold included in one of 15 the first set of resource exclusion thresholds or the second set of resource exclusion thresholds.

\* \* \* \* \*